United States Patent

(12) United States Patent
Ghatak et al.

(10) Patent No.: US 10,887,727 B2
(45) Date of Patent: Jan. 5, 2021

(54) COMPUTER-IMPLEMENTED DETECTION OF A WORK-RELATED VISIT BASED ON DATA FROM MOVEMENT-SENSING MECHANISM(S)

(71) Applicant: Microsoft Technology Licensing, LLC, Redmond, WA (US)

(72) Inventors: Kausik Ghatak, Bangalore (IN); Suyash Kumar Tiwari, Bangalore (IN); Ravi Krishnan, Kolkata (IN); Sarang Deshpande, Bangalore (IN); Moinak Chatterjee, Bangalore (IN); Shabaz Ahmed, Bengaluru (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/213,264

(22) Filed: Dec. 7, 2018

(65) Prior Publication Data
US 2020/0186967 A1    Jun. 11, 2020

(51) Int. Cl.
*G06F 9/448* (2018.01)
*H04W 4/029* (2018.01)
*H04W 4/021* (2018.01)

(52) U.S. Cl.
CPC .......... *H04W 4/029* (2018.02); *H04W 4/021* (2013.01)

(58) Field of Classification Search
CPC ...... G06F 9/448; G06F 3/0604; G06F 9/4498; H04W 4/027
See application file for complete search history.

(56) References Cited

U.S. PATENT DOCUMENTS

| | | | |
|---|---|---|---|
| 8,036,679 B1 * | 10/2011 | Barbeau ................. | H04W 4/02 455/456.1 |
| 9,721,305 B2 | 8/2017 | Bomze et al. | |
| 2007/0072583 A1 * | 3/2007 | Barbeau ............ | H04M 3/42348 455/404.2 |
| 2007/0088834 A1 * | 4/2007 | Litovski ............. | H04L 63/0272 709/227 |

(Continued)

OTHER PUBLICATIONS

PCT Search Report and Written Opinion in PCT/US2019/063826, dated Mar. 20, 2020, 14 pages.

*Primary Examiner* — Rafael Pérez-Gutiérrez
*Assistant Examiner* — Xiang Zhang

(57) ABSTRACT

A computer-implemented technique is described herein for detecting work-related visits. The technique includes receiving movement data from one or more movement-sensing mechanisms associated with a local computing device carried by a user. The technique further includes: determining, using a state machine, and based on the movement data, that a user has commenced a candidate visit, the candidate visit being described by visit data; determining, using the state machine, and based on the movement data, that the user has completed the candidate visit; and determining, using a context-determining component, and based on the visit data, whether the candidate visit corresponds to a work-related visit for which work has been completed. The technique further includes mechanisms that allow the user to add a content item to the visit data of an ongoing visit, prevent private data from leaving the local computing device, and efficiently consume power of the local computing device.

17 Claims, 13 Drawing Sheets

(56) References Cited

U.S. PATENT DOCUMENTS

| | | | |
|---|---|---|---|
| 2007/0184836 A1* | 8/2007 | He | H04W 52/0245 |
| | | | 455/434 |
| 2013/0090151 A1* | 4/2013 | Ngai | H04W 52/0241 |
| | | | 455/574 |
| 2013/0091279 A1* | 4/2013 | Haddad | H04L 12/2834 |
| | | | 709/225 |
| 2013/0103764 A1* | 4/2013 | Verkasalo | G06Q 30/02 |
| | | | 709/204 |
| 2014/0089043 A1* | 3/2014 | Weinstein | G06Q 30/02 |
| | | | 705/7.29 |
| 2014/0171064 A1* | 6/2014 | Das | H04W 84/18 |
| | | | 455/426.1 |
| 2014/0310366 A1* | 10/2014 | Fu | H04L 51/04 |
| | | | 709/206 |
| 2015/0018014 A1 | 1/2015 | Phan | |
| 2015/0120336 A1* | 4/2015 | Grokop | B60W 40/09 |
| | | | 705/4 |
| 2015/0198722 A1* | 7/2015 | Ben-Akiva | G01S 19/49 |
| | | | 701/472 |
| 2015/0288829 A1* | 10/2015 | Lu | H04M 15/56 |
| | | | 370/259 |
| 2016/0216123 A1* | 7/2016 | Liao | G06Q 10/08 |
| 2016/0300263 A1 | 10/2016 | Priness et al. | |
| 2018/0082206 A1* | 3/2018 | Yang | G01C 21/3679 |
| 2018/0114148 A1* | 4/2018 | Balaji | H04M 15/41 |
| 2018/0115866 A1 | 4/2018 | Gonzalez et al. | |

* cited by examiner

1502

```
┌─────────────────────────────────────────────────────────────────┐
│ DETERMINE A POWER-RELATED STATUS OF A LOCAL COMPUTING DEVICE,    │
│ THE POWER-RELATED STATUS DEPENDING ON: AN INPUT SIGNAL WHICH     │
│ INDICATES A BATTERY LEVEL OF A LOCAL COMPUTING DEVICE; AND/OR    │
│ AN INPUT SIGNAL WHICH INDICATES WHETHER THE LOCAL COMPUTING      │
│ DEVICE IS CURRENTLY CONNECTED TO AN EXTERNAL CONSTANT POWER      │
│ SOURCE.                                                          │
│ 1504                                                             │
└─────────────────────────────────────────────────────────────────┘
                                 │
                                 ▼
┌─────────────────────────────────────────────────────────────────┐
│ SET AT LEAST ONE OPERATING PARAMETER OF A STATE MACHINE BASED    │
│ ON THE POWER-RELATED STATUS THAT IS IDENTIFIED.                  │
│ 1506                                                             │
└─────────────────────────────────────────────────────────────────┘
                                 │
                                 ▼
┌─────────────────────────────────────────────────────────────────┐
│ RECEIVE MOVEMENT DATA FROM ONE OR MORE MOVEMENT-SENSING          │
│ MECHANISMS ASSOCIATED WITH THE LOCAL COMPUTING DEVICE CARRIED    │
│ BY A USER.                                                       │
│ 1508                                                             │
└─────────────────────────────────────────────────────────────────┘
                                 │
                                 ▼
┌─────────────────────────────────────────────────────────────────┐
│ DETERMINE, USING THE STATE MACHINE, AND BASED ON THE MOVEMENT    │
│ DATA, THAT A USER HAS COMMENCED A CANDIDATE VISIT BY ARRIVING    │
│ AT AN IDENTIFIED SITE, THE CANDIDATE VISIT BEING DESCRIBED BY    │
│ VISIT DATA.                                                      │
│ 1510                                                             │
└─────────────────────────────────────────────────────────────────┘
                                 │
                                 ▼
┌─────────────────────────────────────────────────────────────────┐
│ DETERMINE, USING THE STATE MACHINE, AND BASED ON THE MOVEMENT    │
│ DATA, THAT THE USER HAS COMPLETED THE CANDIDATE VISIT BY         │
│ DEPARTING FROM THE SITE.                                         │
│ 1512                                                             │
└─────────────────────────────────────────────────────────────────┘
```

COMPUTER-IMPLEMENTED DETECTION OF A WORK-RELATED VISIT BASED ON DATA FROM MOVEMENT-SENSING MECHANISM(S)

BACKGROUND

Mobile computing devices provide a wealth of movement-related signals (position signals, motion signals, etc.) that reflect the kind of movements exhibited by users who carry these devices. But it is difficult to make constructive use of these signals in an effective and resource-efficient manner.

SUMMARY

A computer-implemented technique is described herein for detecting work-related visits. In one implementation, the technique includes receiving movement data from one or more movement-sensing mechanisms associated with a local computing device carried by a user. The movement-sensing mechanisms include: at least one location-determining mechanism that identifies a current location of the user; and at least one movement-sensing mechanism that identifies a kind of motion exhibited by the user, and/or a transition from one kind of motion to another kind of motion. The technique further includes: determining, using a state machine, and based on the movement data, that a user has commenced a candidate visit by arriving at an identified site, the candidate visit being described by visit data; determining, using the state machine, and based on the movement data, that the user has completed the candidate visit by departing from the site; determining, using a context-determining component, whether the candidate visit corresponds to a work-related visit. A work-related visit has prescribed characteristics indicating that work, having an identifiable value, is performed.

According to one illustrative aspect, the state machine includes: at least one perimeter-checking state which establishes a perimeter with respect to an identified location, the state machine subsequently determining whether the user has moved outside the perimeter; at least one location-determining state which requests a movement-sensing mechanism to determine a current location of the user with a prescribed degree of accuracy; and at least one timer state which provides a countdown timer for determining whether a movement condition has prevailed for more than a prescribed amount of time.

According to another illustrative aspect, the technique includes presenting a user interface presentation during the candidate visit upon its commencement. The user interface presentation gives the user the opportunity to add one or more supplemental content items (e.g., notes, images, audio, etc.) to the visit data.

According to another illustrative aspect, the technique includes: determining a power-related status of the computing device, pertaining to one or more of a battery level of the computing device, and/or an indication of whether the computing device is currently connected to a constant external power source; and setting at least one operating parameter of the state machine based on the power-related status that is identified.

According to another illustrative aspect, the technique includes: determining whether to send the visit data to a remote computing device based on at least one privacy-related input signal; and if said determining whether to send the visit data is answered in the affirmative, sending the visit data to the remote computing device.

According to another illustrative aspect, the technique forwards the visit data to a remote computing device for any type of application-specific processing of the work-related visit, such as invoicing the work-related visit.

The above-summarized technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 13-15 show three respective flowcharts that describe different aspects of the operation of the VPS of FIGS. 2 and 4.

Figure 1:
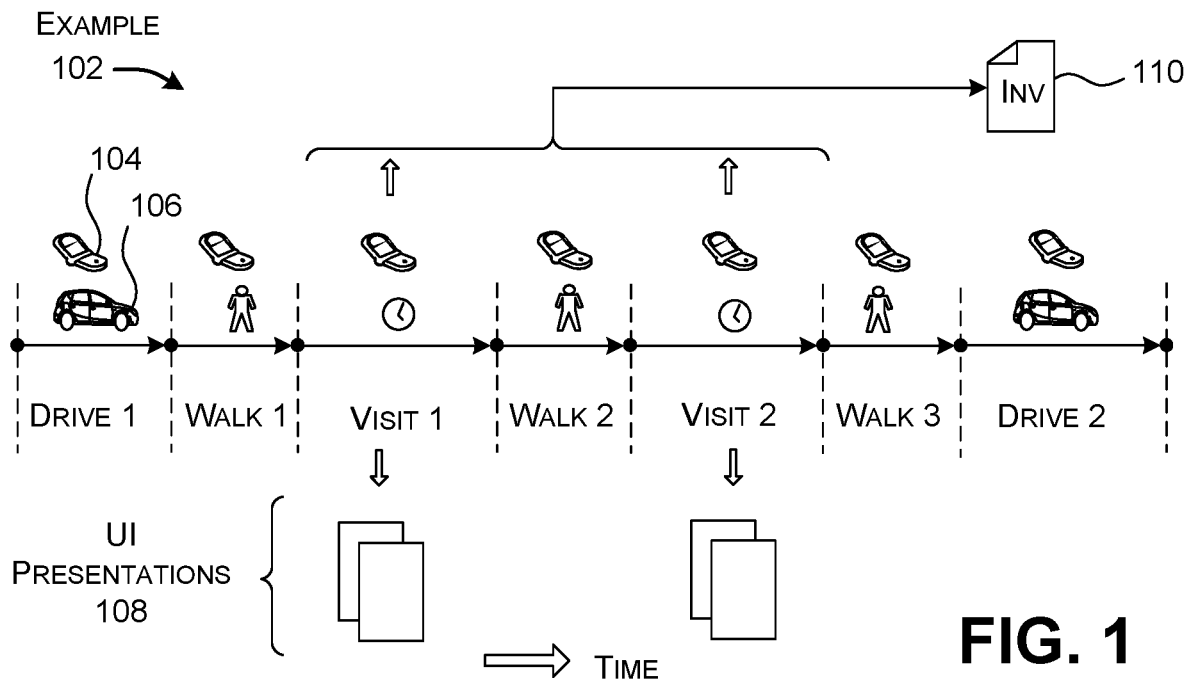
FIG. 1 shows an example scenario in which a visit-processing component (VPS) is used to determine plural work-related visits made by a user who carries a local computing device.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computing environment for detecting work-related visits made by a user, based on movement data provided by one or more movement-sensing mechanisms associated with a computing device carried by a user. Section B sets forth illustrative methods which explain the operation of the computing environment of Section A. And Section C describes illustrative computing functionality that can be used to implement any aspect of the features described in Sections A and B.

As a preliminary matter, the term "hardware logic circuitry" corresponds to one or more hardware processors (e.g., CPUs, GPUs, etc.) that execute machine-readable instructions stored in a memory, and/or one or more other hardware logic components (e.g., FPGAs) that perform operations using a task-specific collection of fixed and/or programmable logic gates. Section C provides additional information regarding one implementation of the hardware logic circuitry. Each of the terms "component," "engine," "tool," etc. refers to a part of the hardware logic circuitry that performs a particular function.

In one case, the illustrated separation of various parts in the figures into distinct units may reflect the use of corresponding distinct physical and tangible parts in an actual implementation. Alternatively, or in addition, any single part illustrated in the figures may be implemented by plural actual physical parts. Alternatively, or in addition, the depiction of any two or more separate parts in the figures may reflect different functions performed by a single actual physical part.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be implemented by the hardware logic circuitry described in Section C, which, in turn, can be implemented by one or more hardware processors and/or other logic components that include a task-specific collection of logic gates.

As to terminology, the phrase "configured to" encompasses various physical and tangible mechanisms for performing an identified operation. The mechanisms can be configured to perform an operation using the hardware logic circuitry of Section C. The term "logic" likewise encompasses various physical and tangible mechanisms for performing a task. For instance, each processing-related operation illustrated in the flowcharts corresponds to a logic component for performing that operation. A logic component can perform its operation using the hardware logic circuitry of Section C. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative Visit-Processing System

A.1. Overview of the System

FIG. 1 shows an example scenario 102 in which a visit-processing component (VPS) is used to identify two work-related visits made by a user who carries a local computing device 104, such as a smartphone, tablet computing device, laptop computing device, etc. In a first phase, the user drives a vehicle 106 from a first location to a second location. For instance, the first location may be the user's home, and the second location may be a parking lot near the places where the user plans to perform work. In a second phase, the user walks from the second location to a first client site. In a third phase, the user performs work at the first client site. In a fourth phase, the user walks from the first client site to a second client site. In a fifth phase, the user performs work at the second client site. In a sixth phase, the user walks from the second client site to his or her vehicle. In a seventh phase, the user drives the vehicle 106 back to the first location. This example is merely illustrative. In other cases, a user's behavior includes additional (or fewer) phases of movement, and/or other sequences of phases, and/or other mode(s) of transportation, etc.

At each phase, the local computing device 104 receives movement data from one or more movement-sensing mechanisms associated with the local computing device 104. At least one movement-sensing mechanism determines the position of the user at a current point in time. At least one movement-sensing mechanism determines the type of movement that the user is currently performing (in a manner to be described below). At least one movement-sensing mechanism determines transitions that a user makes from one kind of movement to another. These categories of mechanism(s) are not mutually exclusive, meaning that a movement-sensing mechanism can collect two or more of the types of data summarized above.

The VPS analyzes the movement data to identify each candidate visit that the user has made, here corresponding to the first and second client visits. The VPS performs this task by identifying a juncture at which the user arrives at each work site, and a juncture at which he or she leaves that site. In other words, the VPS performs this task by identifying periods of relative positional stability interspersed among periods of travel. The VPS then determines whether the identified candidate visits correspond to work-related visits. As used herein, a candidate visit generally corresponds to any phase at which a user remains at a particular place for more than a prescribed length of time. A work-related visit corresponds to a candidate visit in which the user is presumed to be performing work, e.g., for which compensation is expected, or which otherwise has some identifiable value (e.g., economic value). Subsection A.2 describes in detail how the VPS determines whether these conditions are met.

Optionally, the VPS can display one or more user interface presentations 108 each time it detects that the user has arrived at a candidate location. The user may interact with these user interface presentations 108 to add supplemental content items to the visit data associated with a candidate visit. Subsection A.4 provides further details regarding this aspect of the VPS. Optionally, the VPS can also generate an invoice 110 associated with each work-related visit, and send that invoice 110 to an appropriate recipient. Subsection A.5 provides further details regarding this aspect of the VPS.

Figure 2:
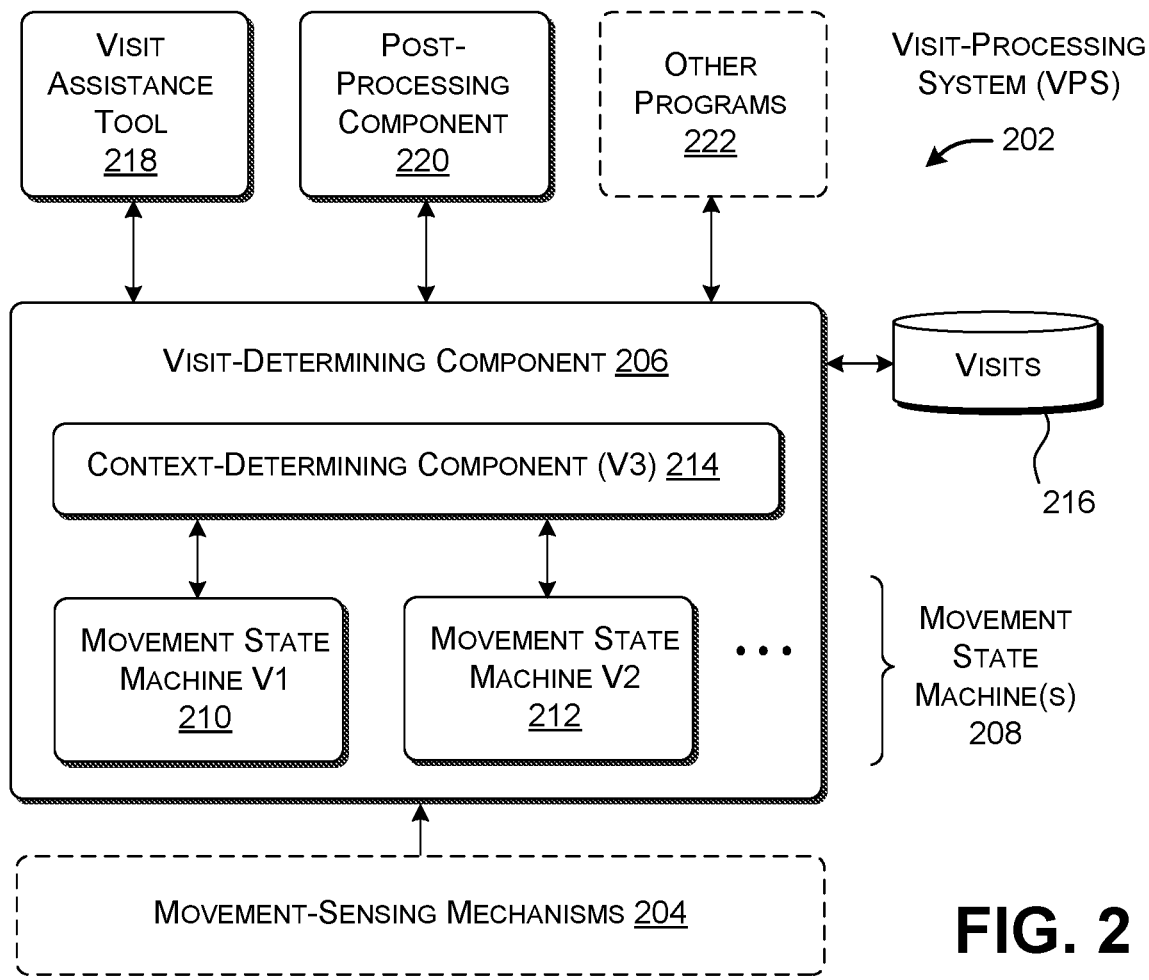
FIG. 2 shows an overview of the VPS.

FIG. 2 shows an overview of a visit-processing system (VPS) 202 that can perform the above-described functions. The VPS 202 receives movement data from one or more movement-sensing mechanisms 204. The movement-sensing mechanism(s) 204 are described in greater detail below. A visit-determining component 206 determines whether the movement data indicates that the user has made (or is currently making) a visit. The visit-determining component 206, in turn, includes one or more state machines 208, such as a first (V1) state machine 210, and a second (V2) state machine 212. Each state machine analyzes the movement data to determine the occurrence of an event which indicates that a user has commenced a visit, and the occurrence of an event which indicates that the user has ended the visit. More specifically, the state machine(s) 208 operate based on the premise that a user commences a visit when he or she arrives at a destination after traveling by one or more modes of transportation (driving, walking, etc.). They further posit that a user ends a visit when he or she departs from that site. A candidate visit corresponds to the time spent between the starting (arrival) and ending (departure) states.

A context-determining component 214 determines whether each candidate visit is a work-related visit. The context-determining component 214 can perform this operation by performing one or more tests described below. Generally stated, the context-determining component 214 identifies a candidate visit as a work-related visit when the attributes of the candidate visit match those of a work-related visit, given an identified profile associated with the user. The profile identifies the type of work performed the user, and the country, city, etc. where the user works, etc. In one implementation, some aspects of the context-determining component 214 are implemented by the local computing device 104 and some aspects are implemented by a remote computing device. Further note that, while FIG. 2 shows the context-determining component 214 as a separate module from the state machine(s) 208, in other implementations, aspects of the state machine(s) 208 can perform parts of the context-detecting function.

The visit-determining component 206 stores visit data describing each candidate visit that it identifies in a data store 216. The visit data can include salient information regarding the visit, such as its starting time, ending time, duration, location, name of location etc. The visit-determining component 206 can determine the name of a location by using a database which maps geographical coordinates (e.g., longitude and latitude coordinates) to place name information, if available. The visit-determining component 206 can optionally persist only visit data for work-related visits.

The first state machine 210 can differ from the second state machine 212 in various ways. For example, the second state machine 212 can use a more robust collection of movement signals compared to the first state machine 210. Further, the second state machine 212 can provide a more nuanced interpretation of the user's movement compared to the first state machine 210, such as by being able to discriminate between different modes of travel. Further, the second state machine 212 may use more complex logic compared to the first state machine 210. On the other hand, the first state machine 210 may offer better performance than the second state machine 212, e.g., in terms of its utilization of resources, throughput, etc. Note that while FIG. 2 shows two state machines (210, 212), other implementations can include more than two state machines, or a single state machine.

An application which consumes the output of the visit-determining component 206 can opt to use any one of the state machines (210, 212, . . . ) for any reasons. For example, an application can choose to use the first state machine 210 because the computing device on which it runs lacks the movement-sensing mechanism(s) required by the second state machine 212. Or an application can choose to use the first state machine 210 because it does not require the nuanced interpretation provided by the second state machine 212. In yet other cases, an application can choose to use the first state machine 210 because it offers better utilization of resources and/or throughput compared to the second state machine 212, etc.

A visit assistance tool 218 provides one or more services to the user during the course of a candidate visit, and/or at the completion of a candidate visit. A post-processing component 220 performs any post-processing operation on the visit data associated with a work-related visit, such as by generating an invoice for the work-related visit. Finally, FIG. 2 indicates that one or more other programs 222 can also consume the visit data produced by the visit-determining component 206.

Figure 3:
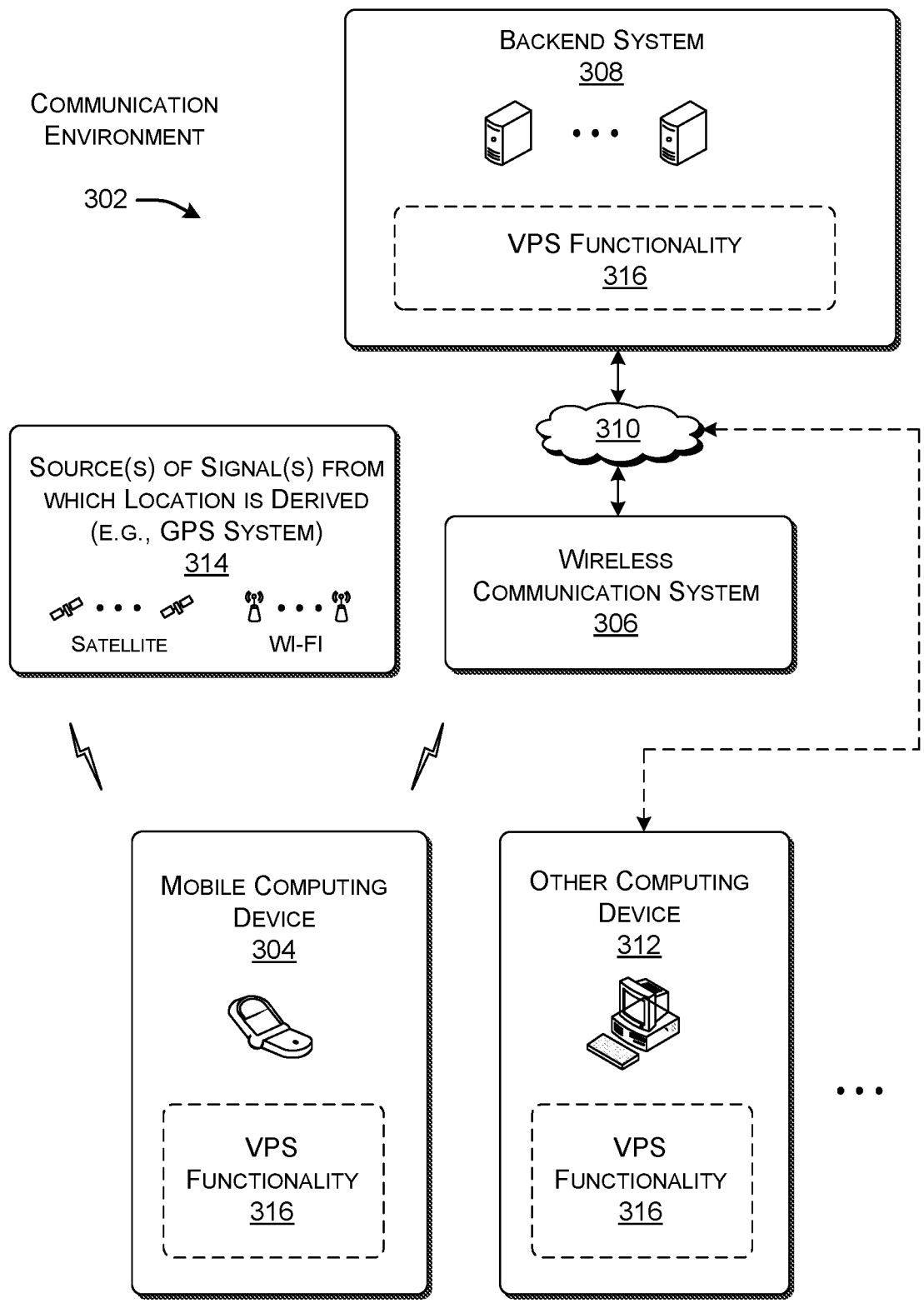
FIG. 3 shows one environment in which the VPS of FIG. 2 may operate.

FIG. 3 shows one communication environment 302 in which the VPS 202 of FIG. 2 may operate. In this figure, at least one mobile computing device 304 interacts with a wireless communication system 306 via the exchange of wireless signals. The mobile computing device 304 (which corresponds to the local computing device 104 of FIG. 1) may correspond to a smartphone, a tablet-type computing device, a portable game device, a wearable computing device, a mixed-reality device, etc. The wireless communication system 306 can include a collection of wireless towers, one or more base stations, one or more central processing stations, etc.

The wireless communication system 306, in turn, may communicate with a backend system 308 via a computer network 310. The backend system 308 may be implemented by one or more servers, located at a single site, or distributed over plural sites. The computer network 310 may correspond to a local area network, a wide area network (e.g., the Internet), one or more point-to-point communication links, etc.

At least one other computing device 312 may communicate directly with the backend system 308 via the computer network 310, or through the wireless communication system 306. For example, the other computing device 312 may correspond to a desktop computing device.

FIG. 3 also generally shows one or more sources 314 of signals from which location may derived. For example, the source(s) 314 may include a set of Global Positioning System (GPS) satellites and associated equipment which provide GPS signals. The source(s) 314 may also include a set of WI-FI access points, BLUETOOTH beacons, etc. The source(s) 314 may also include a set of cell phone towers. The cell phone towers correspond to part of the wireless communication system 306. A database (not shown) stores the known locations of the WI-FI access points, beacons, cell phone towers.

Finally, FIG. 3 shows that the mobile computing device 304, the other computing device 312, and the backend system 308 all include an instance of VPS functionality 316. This indicates that each of these components can implement any aspect(s) of the VPS 202 of FIG. 2. For example, the mobile computing device 304 can capture movement data, detect visit data based on the movement data, and send the visit data to the backend system 308. The backend system 308 can implement at least part of the context-determining component 214 and the post-processing component 220. The other computing device 312 can include at least functionality that allows the user to interact with the post-processing component 220. Or the user may interact with the post-processing component 220 through a browser program, without local VPS functionality 316.

Figure 4:
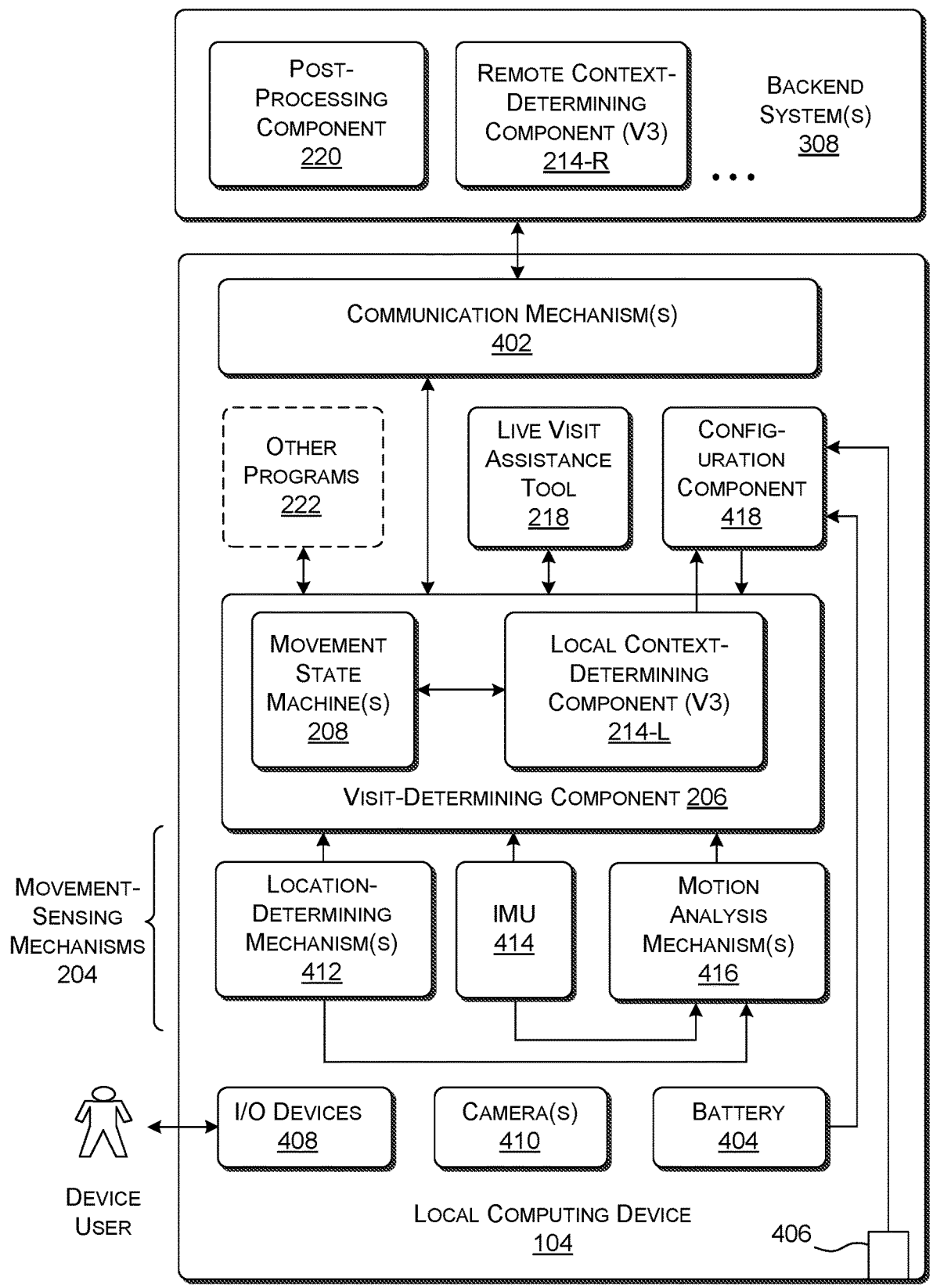
FIG. 4 shows one implementation of the VPS of FIG. 2.

FIG. 4 shows one implementation of the local computing device 104 and the backend system 308. The local computing device 104 includes one or more communication mechanisms 402, a battery 404, a power connector 406, one or more input devices and one or more output devices (abbreviated as "I/O devices") 408, one or more cameras 410, etc. Each communication mechanism can include a wireless transmitter and/or receiver for transmitting/receiving wireless signals within a specific communication band and subject to a specific communication protocol. The connector 406 supplies constant alternating current (AC) power to the computing device 104 when tethered to a power outlet, for use in powering the components of the computing device 104 and for recharging the battery 404. The input devices allow a user to provide input signals to the computing device 104. The input devices can include a touch-sensitive surface (e.g., a touch-sensitive screen), one or more hardware buttons or keys, a microphone, etc. The output devices expose output information provided by the computing device 104. The output devices can include one or more display devices, one or more speakers, etc. The camera(s) 410 allow the computing device 104 to capture image information.

The computing device 104 also includes one or more movement-sensing mechanism(s) 204. For example, one or more location-determining mechanisms 412 determine the location of the computing device 104. For instance, the location-determining mechanism(s) 412 can include a GPS component that uses triangulation to determine the location of the computing device 104 based on GPS signals transmitted by GPS satellites. The location-determining mechanism(s) 412 can include other components which perform the same function based on signals transmitted from various terrestrial sources, such as cell towers, WI-FI access points, BLUETOOTH beacons, etc. Among the location-determining mechanism(s) 412, the GPS component provides the best accuracy (e.g., with a range of error of a few meters in some cases), but consumes the most power. More generally, the location-determining mechanism(s) 412 are considered movement-sensing mechanism(s) insofar as they can be used to track the movement of the computing device 104 over time.

The movement-sensing mechanism(s) 204 also includes an Inertial Measurement Unit (IMU) 414 for determining the motion exhibited by the computing device 104. The IMU 414 can include one or more accelerometers, one or more gyroscopes, one or more magnetometers, etc. The IMU 414 can determine the movement of the computing device 104 in six degrees of freedom.

The movement-sensing mechanism(s) 204 also include any motion analysis mechanism(s) 416. Each such mechanism determines the type of movement exhibited by the computing device 104, and/or the transition from one type of movement to another (such as waking to driving, remaining still to moving, etc.). The motion analysis mechanism(s) 416 perform this task by operating on raw movement data provided by the location-determining mechanism(s) 412 and/or the IMU 414.

In one approach, the motion analysis mechanism(s) 416 can perform its analysis task using any type of pattern-matching technology which compares a stream of raw movement data with telltale patterns associated with known types of movement. For instance, the motion analysis mechanism(s) 416 can use discrete rules to determine the type of movement exhibited by the user. For example, the motion analysis mechanism(s) 416 can determine that the user is traveling in a motorized vehicle if the rate of change in the user's position exceeds a prescribed threshold. Similarly, the motion analysis mechanism(s) 416 can detect that the user is at rest when the raw movement data shows an extent of motion below a prescribed threshold, and/or a change in position below a prescribed threshold. Alternatively, or in addition, the motion analysis mechanism(s) 416 can use a machine-trained model to perform this task (such as a Recurrent Neural Network (RNN), etc.), or a pattern-matching technique that does not use a machine-trained model (such as the Dynamic Time Warping (DTW) technique, a frequency-based technique, etc.). Finally, the motion analysis mechanism(s) 416 can determine that a motion-related transition has occurred when it detects a new kind of motion, with respect to a previously-prevailing kind of motion. The motion analysis mechanism(s) 416 can provide output signals that identify a series of motion-related events, such as the type of movement that is currently being detected (such as WALKING=TRUE, which indicates that the user is currently walking), and/or the transition from one type of movement to another (such as STILL_STOP=TRUE, which indicates that the user has ceased a state of stasis and begun moving).

The computing device 104 also includes hardware logic circuitry for performing various other operations. Section C describes one implementation of the hardware logic circuitry. The hardware logic circuitry, for instance, can implement the visit-determining component 206, the visit assistance tool 218, and various other programs 222. More specifically, in the non-limiting implementation of FIG. 4, the visit-determining component 206 implements the movement state machine(s) 208 and a local version of the context-determining component 214-L.

Assume that the backend system 308 implements the post-processing component 220 and a remote version of the context-determining component 214-R. The local context-determining component 214-L and the remote context-determining component 214-R perform different tasks directed to the goal of determining whether a candidate visit corresponds to a work-related visit. The computing device 104 can interact with the backend system 308 through the communication path described in FIG. 3.

Finally, the computing device 104 includes a configuration component 418 which determines an operating mode of the visit-determining component 206. More specifically, the configuration component 418 performs at least two main roles. In a first role, the configuration component 418 determines a mode which governs the amount of resources the visit-determining component 206 consumes in detecting visits. It makes this determination, in part, based on input signals which reflect the current charge level of the battery 404, and an indication of whether the computing device 104 is currently connected to an AC power source via the power connector 406. In a second role, the configuration component 418 determines a mode which governs the extent to which the computing device 104 shares visit data with the backend system 308. Subsection A.3 provides additional details regarding the operation of the configuration component 418.

A.2. The Visit-Determining Component

Figure 5:
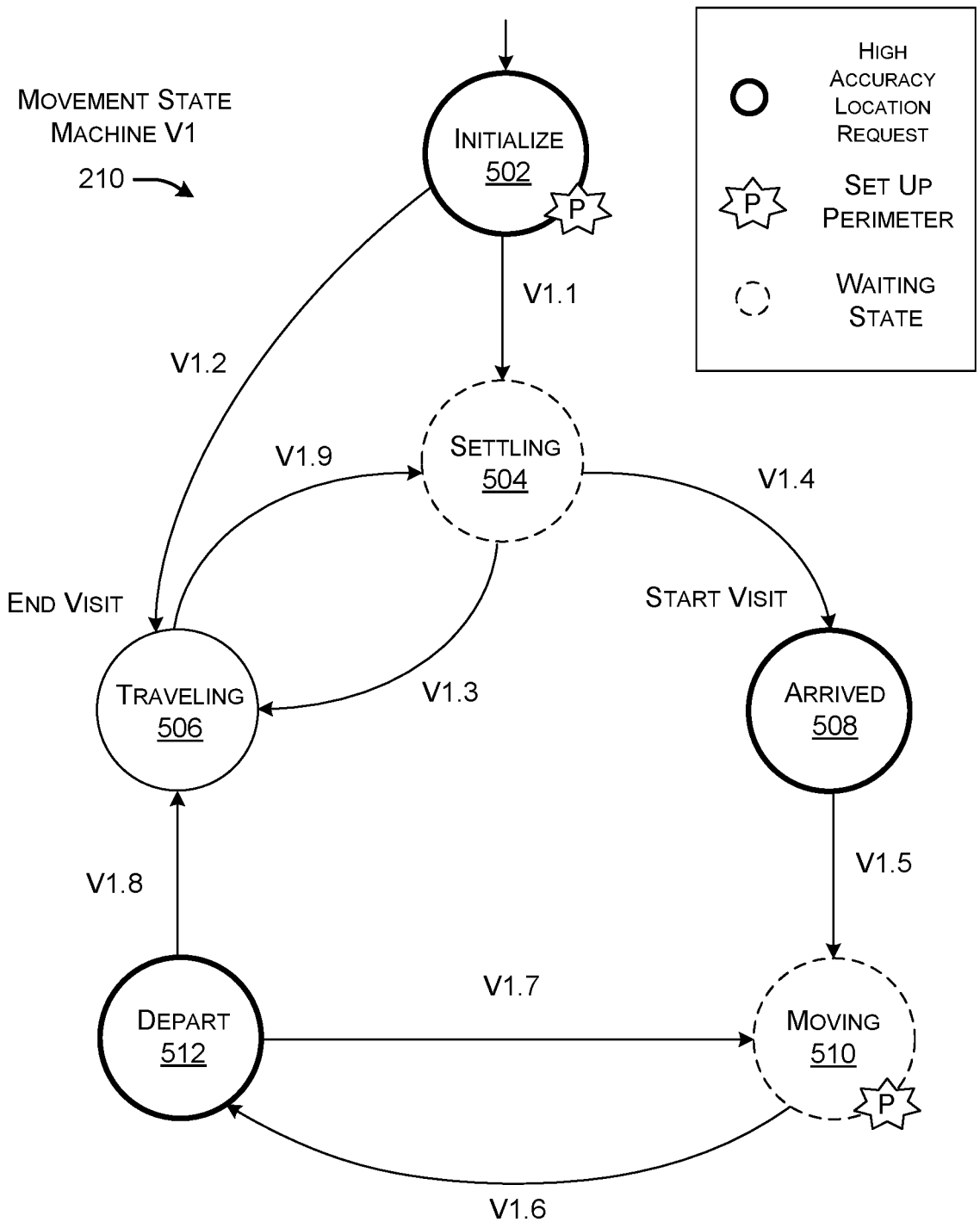
FIG. 5 shows a first (V1) state machine for use in the VPS of FIG. 4.
Figure 6:
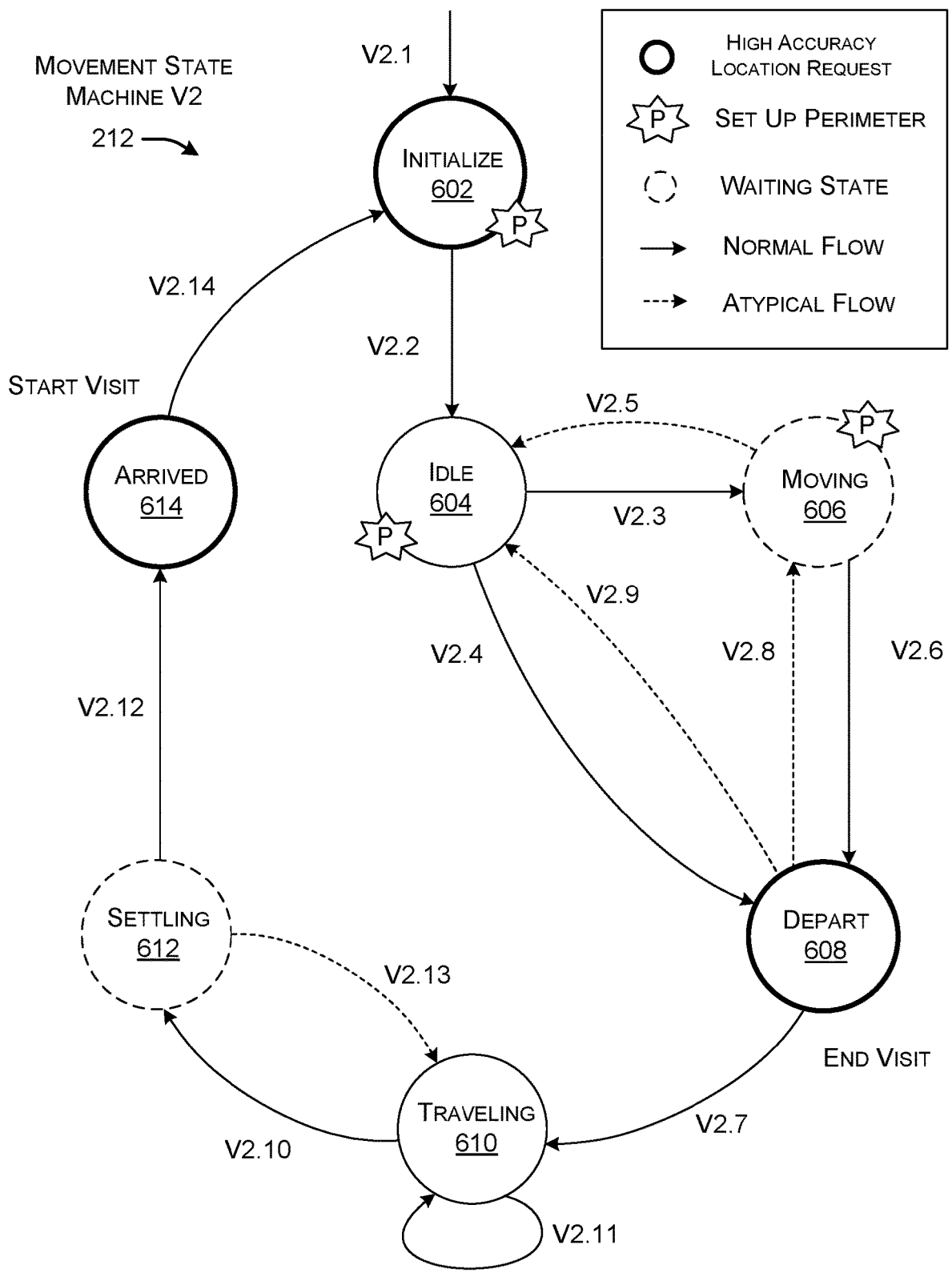
FIG. 6 shows a second (V2) state machine for use in the VPS of FIG. 4.

FIGS. 5 and 6 show one implementation of the first state machine 210 and the second state machine 212, respectively. These state machines (210, 212) contain at least three types of states. A state associated with a circle tagged with the label "P" involves setting up a perimeter (e.g., a geofence) around a current location of the computing device 104. For instance, the perimeter may correspond to a circular perimeter around the current location of radius 200 m. This state (or another state) then determines whether the user has moved outside of the perimeter. In one implementation, the computing device 104 determines whether it has moved outside of a perimeter using triangulation based on various terrestrial signal sources (such as cell towers, WI-FI access points, etc.). This method for determining location does not use as much power as GPS triangulation, but it also provides less accurate readings compared to GPS triangulation. Because of this relative inaccuracy, it is possible that the computing device 104 can reach a false conclusion that it has moved outside a perimeter.

A state denoted with a circle having a thick-lined border involves requesting the location-determining mechanism(s) 412 to determine the location of the computing device 104 with relatively high accuracy, if permitted by a power mode in which the computing device 104 is currently operating. For example, this state can involve using the GPS component to determine the location of the computing device 104, or using a combination of the GPS component and one or more other kinds of position-determining mechanisms (such as cell tower triangulation, WI-FI access point triangulation, etc.). More specifically, this state is said to provide a high-accuracy measurement of location relative to less accurate methods of determining location, such as the use of cell tower triangulation by itself.

A state denoted with a circle having a dashed-line border involves starting a countdown timer. Using this countdown timer, the state determines whether a movement condition has prevailed for more than a prescribed amount of time. For instance, this state involves determining whether the countdown timer expires without receiving one or more specified movement-related events.

The first state machine 210 will be now be described in greater below, followed by the second state machine 212. As previously mentioned, the first state machine 210 represents a more resource-efficient mechanism compared to the second state machine 212, but presents a less nuanced detection of the visit-related behavior of the user compared to the second state machine 212.

Initialize State. In an Initialize 502 state, the first state machine 210 requests the location-determining mechanism(s) 412 to obtain an accurate indication of the computing device's current location, e.g., using the GPS component. It then sets up a perimeter around that location and listens the event signals STILL_START and STILL_STOP. A STILL_START=TRUE signal indicates that the user has entered a motionless condition. A STILL_STOP=TRUE signal indicates that the user has left a motionless condition. If the first state machine 210 receives the STILL_START=TRUE signal, it transitions to a Settling state 504 (per a transition path V1.1). If the first state machine 210 receives the STILL_STOP=TRUE signal, it transitions to a Traveling state 506 (per a transition path V1.2); further, if there is an existing visit, the first state machine 210 ends that visit.

Settling State. In the Settling state 504, if the first state machine 210 receives a STILL_START=TRUE signal, it registers an error, and ignores this state. If the first state machine 210 receives a STILL_STOP=TRUE signal, it transitions to the Traveling state 506 (per a transition path V1.3); further, if there is an existing visit, the first state machine 210 ends this visit. The Settling state 504 also involves starting a countdown timer (e.g., of a duration of 3 minutes, etc.). If the countdown timer reaches its expiration without receiving a STILL_STOP=TRUE signal, then the first state machine advances to an Arrived state 508 (per a transition path V1.4). At this juncture, the first state machine 210 also registers that a candidate visit has commenced.

Arrived state. In the Arrived state 508, the first state machine 210 requests the location-determining mechanism(s) 412 to detect the position of the computing device 104 with high accuracy. If the first state machine 210 receives a STILL_STOP=TRUE signal, then it transitions to a Moving state 510 (per a transition path V1.5).

Moving state. This state 510 is another waiting state which involves starting a countdown timer. It also involves setting up another perimeter around the current location. If the first state machine 210 detects that the user has moved outside the perimeter, then it advances to a Depart state 512 (per a transition path V1.6). The first state machine 210 also involves moving to the Depart state 512 if the countdown timer expires.

Depart state. In the Depart state 512, the first state machine 210 verifies whether the user has indeed moved outside the perimeter, which it ascertains by requesting the location-determining mechanism(s) 412 to make an accurate position measurement. If the user has not moved outside the perimeter, then, per a transition path V1.7, the first state machine 210 transitions back to the Moving state 510. But if this verification test passes, then, per a transition path V1.8, the first state machine 210 advances to the Traveling state 506. At this juncture, the first state machine 210 also registers the end of a candidate visit.

Traveling state. In this state 506, if the first state machine 210 receives a STILL_START=TRUE event signal, it moves to the Settling state 504 per a transition path V1.9.

In general, note that the first state machine 210 consumes only STILL_START and STILL_STOP event signals. It can therefore be used on computing devices which do not support the use of more complex motion event signals. It also consumes a relatively small amount of power to run, compared to the second state machine 212.

Advancing to the second state machine 212 shown in FIG. 6, per a transition path V2.1, the second state machine 212 advances to an Initialize state 602 when the computing device 104 boots up, or freshly installs, or when the VPS 202 restarts.

Initialize state. In the Initialize state 602, the second state machine 212 requests the position-determining mechanism(s) 412 to obtain an accurate indication of the current location of the computing device 104. It then sets up a perimeter around the current location. Once these actions have been performed, the second state machine 212 advances to an Idle state 604 (per a transition path V2.2).

Idle state. In this state, if the second state machine 212 receives a WALK_START=TRUE event signal, then the second state machine 212 advances to a Moving state 606 (per a transition path V2.3). This event signal indicates that the user has commenced pedestrian travel (e.g., by beginning to walk). On the other hand, if the second state machine 212 determines that the computing device 104 has moved outside the perimeter set up in the Initialize state 602, then the second state machine 212 advances directly to a Depart state 608 (per transition path V2.4).

Moving state. The Moving state 606 involves setting up another perimeter with respect to the current location of the computing device 104. It also involves starting a countdown timer. If the second state machine 212 receives an indication that the countdown timer has expired without the computing device 104 having moved outside the perimeter, then it moves back to the Idle state 604 (per a transition path V2.5). If the second state machine 212 receives an indication that the computing device 104 has moved outside the perimeter, then it advances to the Depart state 608 (per a transition path V2.6). The second state machine 212 also advances to the Depart state 608 if it receives a DRIVE_START=TRUE event signal, indicating that the user has commenced travel via the vehicle 106. Generally, the Moving state 606 operates to suspend making costly high-accuracy location readings while the user is walking, which, in turn, reduces the drain on the computing device's battery 404.

Depart state. In this state, the second state machine 212 advances directly to a Traveling state 610 upon a DRIVE_START=TRUE event signal (per a transition path V2.7), as there is relatively little ambiguity regarding this event. This transition also marks the end of a candidate visit, if such a visit exists. The second state machine 212 also determines whether the user has traveled a minimum distance (e.g., 500 m). The second state machine 212 performs this task by requesting the position-determining mechanism 412 to determine an accurate position measurement. If the second state machine 212 determines that the user has traveled the minimum distance, and if the user is currently still moving, then the second state machine 212 advances to the Traveling state 610 (per the transition path V2.7). On the other hand, the second state machine 212 moves back to the Moving state 606 (per transition path V2.8) if it determines that the user has not traveled the minimum distance, and if the user is still walking. The state machine 212 moves back to the Idle state 604 (per transition path V2.9) if it determines that the user has not traveled the minimum distance by walking, and if the user is not currently walking. Assuming that the second state machine 212 transitions to the Traveling state 610, it sets a variable that identifies the form of movement by which it reached this state (e.g., by walking, driving, or a combination of walking and driving).

Traveling state. In this state, the second state machine 212 advances to a Settling state 612 per a transition path V2.10 if: (1) it reached this state by walking; and (2) it receives a STILL_START=TRUE event signal. It also advances to the Settling state 612 if: (1) it reached this state by driving; and (2) it receives either a STILL_START=TRUE signal or a WALK_END=TRUE signal. A WALK_END=TRUE signal indicates that the use has stopped walking. It also advances to the Settling state 612 if: (1) it reached this state by a combination of driving and walking; and (2) it receives either a STILL_START=TRUE signal or a WALK_END=TRUE signal. For all other event signals, the second state machine 212 remains in the Traveling state 610 (per a transition path V2.11).

Settling state. This state involves starting another countdown timer. In this state, the second state machine 212 advances to an Arrived state 614 per a transition path V2.12 if: (1) the countdown timer expires; and (2) either of the WALK_START or DRIVE_START signals are FALSE. It moves back to the Traveling state 610 per a transition path V2.13 if: (1) the countdown timer has not expired; and (2) either of the WALK_START or DRIVE_START signals is TRUE. For all other event signals, the second state machine remains in the Settling state 612.

Arrived state. In this state 614, the computing device 104 requests the position-determining mechanism 412 to obtain an accurate location. The second state machine 212 then advances to the Initialize state 602 (per transition path V2.14). This transition also marks the start of a new candidate visit.

As a general feature, note that both of the state machines (210, 212) leverage the use of timer countdown states and perimeter-checking states to reduce the number of times that the location-determining mechanism(s) 412 are requested to obtain an accurate position measurement within a location-determining state. By doing this, the state machines (210, 212) reduce the consumption of power, since it takes a relatively large amount of power to obtain accurate position measurements, e.g., using the GPS component. For example, consider the role of the Idle state 604 and the Moving state 606 in the second state machine 212. A user who is intermittently sitting and walking within his or her work environment will likely remain within these states, unless the user moves outside the perimeter established in the Moving state 606. The second state machine 212 does not require a high-accuracy location measurement until the user advances to the Depart state 608.

Figure 7:
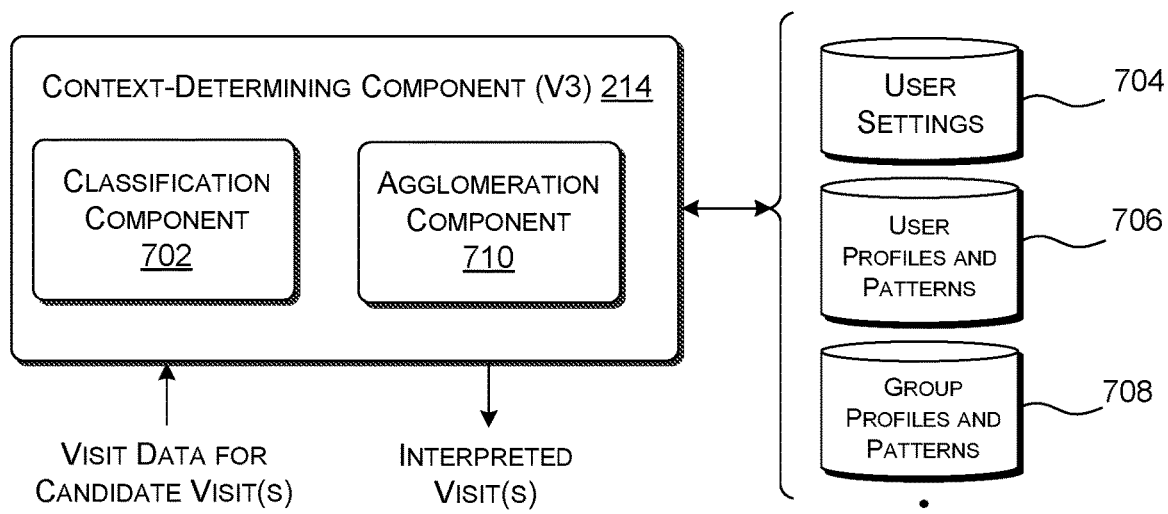
FIG. 7 shows a context-determining component for use in the VPS of FIG. 4. The context-determining component determines whether a candidate visit detected by a state machine is a work-related visit.

FIG. 7 shows one implementation of the context-determining component 214 for determining whether a candidate visit corresponds to a work-related visit, e.g., for which a user expects compensation. The context-determining component 214 is shown as a monolithic module, but it can encompass different subcomponents for performing different respective tests. Further, an environment can distribute these subcomponents in any manner, e.g., by implementing some subcomponents in the local computing device 104, and others in the backend system 308.

According to one personalization strategy, the context-determining component 214 can treat the candidate visits detected by the state machine(s) 208 as de facto work-related visits. The configuration component 418 can bolster this premise by choosing operating parameters for the state machine(s) 208 which are best tuned for detecting work-related visits, and for ignoring non-work-related visits. For example, the configuration component 418 can set the sizes of the perimeters used by the state machine(s) 208 based on a consideration of the geographical scope of a work environment in which a user typically works. This will prevent the state machine(s) 208 from detecting visit commencement or termination events when the user is only moving within his work environment, not traveling from the work environment. Similarly, the configuration component 418 can set the durations associated with the countdown timers used by the state machine(s) based on the temporal patterns associated with the user's work environment. The configuration component 418 can set these parameters by retrieving information regarding the profile of a user, which identifies the occupation associated with the user, the location (e.g., country, city, neighborhood, etc.) in which a user works, etc. This information defines a user context. The configuration component 418 then uses a lookup table to identify the parameters appropriate for that user, given the specified user context. In another implementation, the configuration component 418 can dynamically change the parameters of the state machine(s) based on one or more factors, such as the time of day, the location in which the user is operating, etc. In the above-described first strategy, since the visits detected by the state machine(s) 208 are considered work-related by definition, the context-determining component 214 may be considered co-extensive with the state machine(s) 208, rather than a component that performs further analysis on the visit data produced by the state machine(s) 208.

In another strategy, the context-determining component 214 provides a classification component 702 that invites the user to specify the time spans during each day of the week for which he is to be considered working. The classification component 702 can solicit this information via an appropriately configured user interface presentation. The classification component 702 stores the user's settings in a data store 704. The classification component 702 can thereafter automatically label any candidate visit that is detected within one of the specified time spans as work-related, by definition. Or the classification component 702 can give a high weight value to any candidate visit that occurs within one of these time spans; some other process (e.g., as described below) then takes this weight value into consideration, along with other factors, in determining whether a candidate visit detected by a state machine is a work-related visit. In addition, or alternatively, the context-determining component 214 can invite the user to identify specific locations or types of locations that are considered work-related by default. In addition or alternatively, the context-determining component 214 can allow a user to formulate one or more rules that describe the circumstances in which a candidate visit is to be considered a work-related visit.

Figure 11:
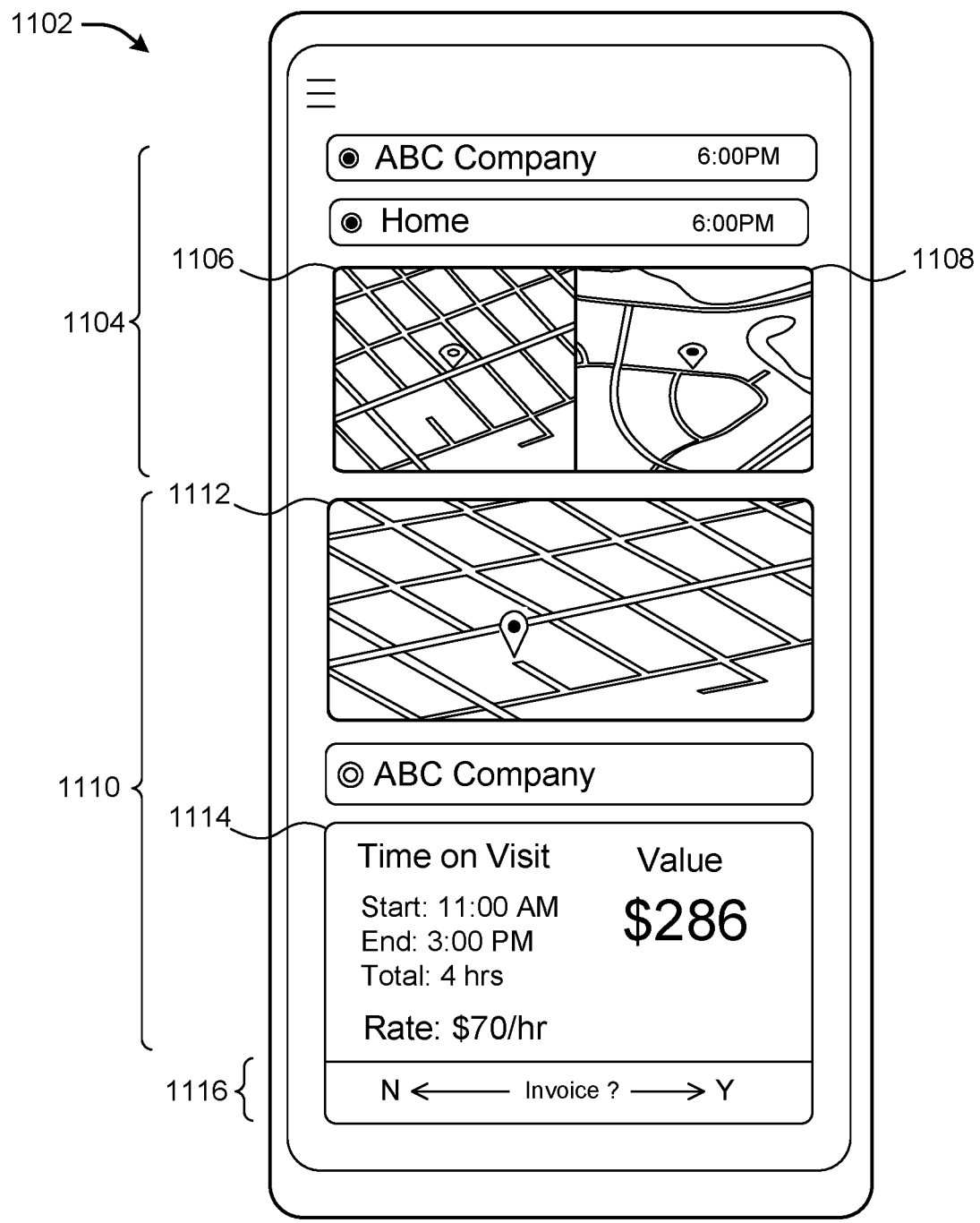
FIG. 11 shows another user interface presentation provided by the visit assistance tool of FIG. 9.

In another strategy, the classification component 702 can determine that a candidate visit is a work-related visit when the user explicitly designates this visit as work-related. The user can perform this task during the course of the visit, or after the visit is completed. FIG. 11, to be described below, shows one user interface presentation in which the user is given the opportunity to label a candidate visit as work-related.

Figure 10:
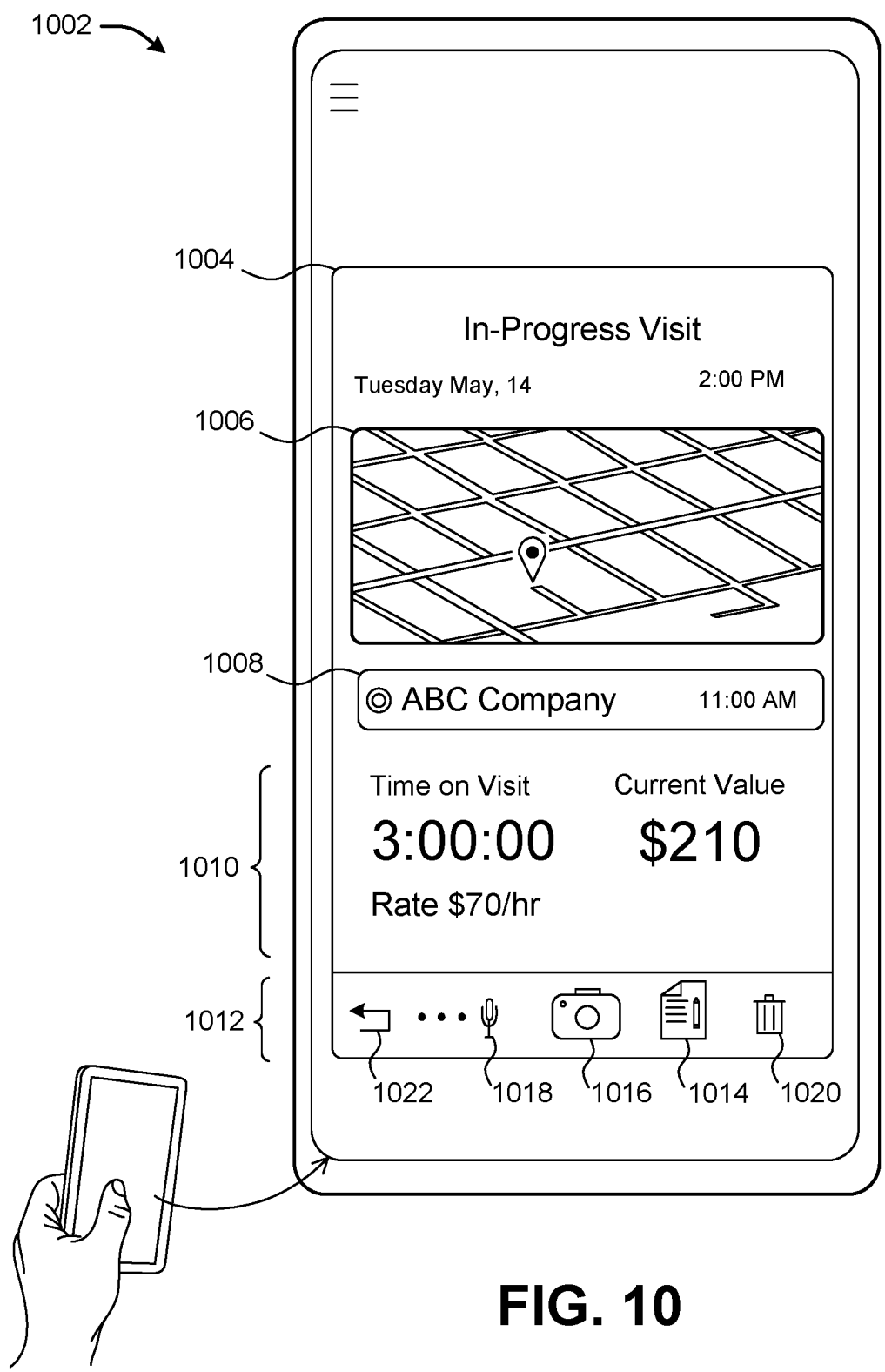
FIG. 10 shows one user interface presentation provided by the visit assistance tool of FIG. 9.

In another strategy, the classification component 702 can determine that a candidate visit is work-related if the user adds a supplemental content item to it, such as textual notes, an image, a voice recording, etc. FIG. 10, to be described below, shows one user interface presentation through which the user may add a supplemental content item to visit data.

In another strategy, the classification component 214 can compare the visit data with patterns associated with prior work-related activity. The classification component 702 can determine that the current visit data is work-related if it matches one or more of these patterns. These patterns may describe the prior work-related behavior of the individual user under consideration. In addition, or alternatively, the patterns may describe the prior work-related behavior of a group of individuals to which the current user belongs. The patterns may also have a place-specific dimension, e.g., by identifying the countries and cities associated with the patterns. A data store 706 stores information regarding the user's own work-related patterns of conduct. The data store 706 can also store profile information regarding the general characteristics of the user, such as the user's profession and/or other affiliations. A data store 708 stores information regarding other users' respective patterns of behavior. The data store 708 can store such information on a group-by-group basis, e.g., by storing information for different occupations. The data stores (706, 708) label each instance of visit data as work-related or non-work-related based on various considerations, such as the manual classification decisions made by the users concerning these prior visits.

For example, assume that the user is an electrician. The user's own work-related visits will reveal that he regularly visits domestic dwellings and commercial establishments between the hours of 9:00 AM to 5:00 PM, on Monday through Friday, within a prescribed geographic radius of his or her business address. The user's own work-related visits may further indicate that he or she spends, on average, 2 hours at each work site. The user's own work-related visits may further indicate that the user does not typically deviate from a radius of 100 m while at a work site. A similar pattern is revealed by examining the work-related habits of all electricians, or a group of electricians who are most similar to the current user. In consideration of these patterns of conduct, the classification component 702 can label any candidate visit within the known work zone of the user, and within the known working hours of the user, as a work-related visit.

Other implementations can use other strategies to identify the occurrence of a work-related visit. Further, any implementation can use two or more of the above-identified tests to identify a work-related visit.

The classification component 702 can use different technologies to make the above-described comparison. In one case, the classification component 702 can use a series of discrete rules to compare the current user's conduct with known patterns of work-related activity. An illustrative rule, for instance, can generate a score for a candidate visit based on a weighted sum of different match factors. The score reflects an assessment of the likelihood that the candidate visit is a work-related visit. Each match factor indicates whether an attribute associated with the candidate visit matches a corresponding attribute associated with a typical work-related visit. For example, one match factor can indicate whether the duration of the candidate visit matches the typical duration of a typical work-related visit.

In another case, the classification component 702 can use one or more machine-trained classification models to perform this task. For example, without limitation, the classification component 702 can use any type of neural network (such as feed-forward neural network, a Convolutional Neural Network (CNN), a Recurrent Neural Network (RNN), etc.) to make this determination. Consider, for example, the use of a feed-forward neural network. A feed-forward neural network receives an input vector which characterizes different features of the user's current candidate visit. It then maps this input vector into a classification result using one or more layers of neural units. More specifically, the values in any layer j of a feed-forward network may be given by the formula, $z_j = f(W_j z_{j-1} + b_j)$, for j=2, . . . N. The symbol $W_j$ denotes a j-th machine-learned weight matrix, and the symbol $b_j$ refers to an optional j-th machine-learned bias vector. These machine-learned weight values intrinsically exhibit the known pattern of work-related activity of the user and/or the occupation to which the user belongs. The activation function $f(x)$ can be formulated in different ways, such as the tan h function, or the rectified linear (ReLU) function, etc. An optional softmax component operates on the output of the preceding layers using a normalized exponential function, to generate a final classification result. That result indicates whether the visit is work-related or not. A training system (not shown) can generate the weight values of the feed-forward neural network using any techniques, such as the gradient descent technique.

The classification component 702 can alternatively use a Support Vector Machine model (SVM), a decision tree model, a logistic regression model, a Bayesian classification model, etc. It can alternatively use a pattern-matching technique that does not employ a machine-trained model. For example, the classification component 702 can use the Dynamic Time Warping (DTW) technique to compare the user's current pattern of conduct with a pattern of conduct known to be associated with work-related activity.

The context-determining component 214 can optionally also include an agglomeration component 710, which determines whether the current candidate visit is a part of a more encompassing work-related visit. In response to this conclusion, the visit-determining component 206 can present output information which conveys the link between the current visit and one or more previous visits.

The agglomeration component 710, like the classification component 702, can use any technology to perform the above-described combining function. For example, the agglomeration component 710 can use a set of discrete rules to perform this function. For instance, consider a candidate visit associated with a particular work site. The agglomeration component 710 can first discard the current visit if the work site corresponds to the user's home or place of business. If not discarded, the agglomeration component 710 can then identify zero, one, or more previous visits that have attributes in common with the candidate visits. The agglomeration component 710 can assess the similarity between the current visit and each prior visit by generating a score based on a weighted sum of matching factors, in the manner described above. The agglomeration component 710 can then combine the current visit with at least one other visit that is assessed as sufficiently similar to the current visit (in which sufficient similarity is determined with reference to any environment-specific threshold value(s)). This merging operation has the effect of designating the current visit as a part or instance of a more encompassing visit.

Alternatively, or addition, the agglomeration component 710 can use a machine-learned clustering model or a non-machine-learned clustering technique to determine whether the current candidate visit is part of a larger work assignment. For example, the agglomeration component 710 can use a neural network to map the visit data associated with the current visit into a current-visit vector in a semantic space. It can similarly map instances of visit data associated with known work assignments of the user into work-assignment vectors within the same semantic space. The agglomeration component 710 can then use any distance metric (such as cosine similarity) to compare the current-visit vector to the work-assignment vectors in the semantic space. If the current-visit vector is sufficiently close to a work-assignment vector associated with a known work assignment (as assessed based on any environment-specific threshold value), then the agglomeration component 710 will add the current visit to that work assignment.

The context-determining component 214 can include a learning component that improves the context-determining component's performance as additional visit data is collected. One way that the learning component improves the performance is by updating the data stores (704, 706, 708) as new visit data is collected. The performance improves because new visit data strengthens trends exhibited by the corpus of visit data. In some implementations, the context-determining component 214 can also weight the significance of prior instances of visit data based on the times at which they were detected, e.g., by decreasing the significance of the visit data in proportion to age. In another strategy, the learning component can retrain the machine-learned model(s) (if any) used by the context-determining component 214 based on new instances of visit data.

The learning component can identify whether a candidate visit is work-related or not based, in part, on the explicit and implicit classification decisions of the user. For example, the learning component stores a signal each time that the user manually designates a candidate visit as work-related or not work-related. It also stores a signal each time that the user manually attaches a supplemental content item to an instance of visit data, and so on. The context-determining component 214 can be expected to progressively improve its ability to discriminate between work and non-work behavior as the user classifies candidate visits in the above-described manner.

A.3. Configuration Component

Figure 8:
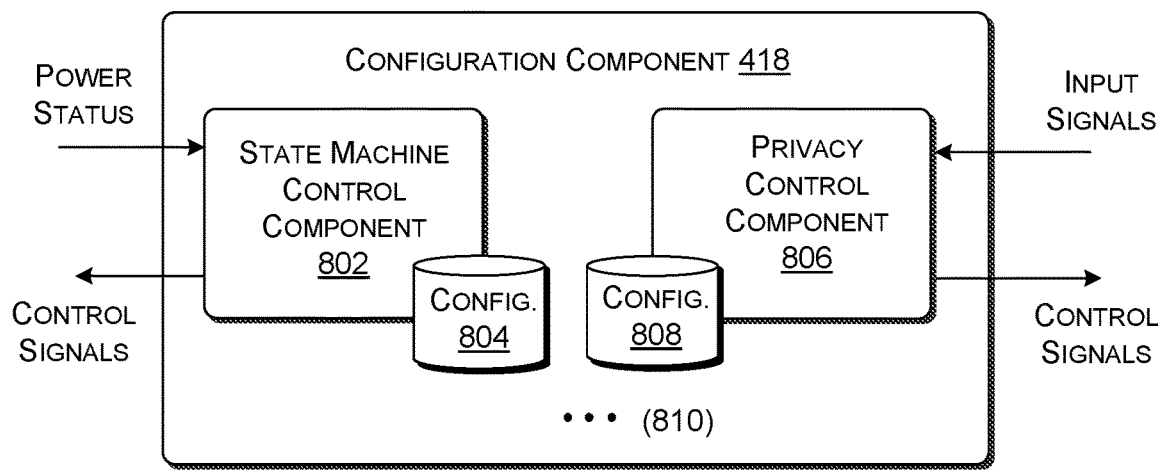
FIG. 8 shows a configuration component for use in the VPS of FIG. 4. The configuration component determines the manner in which the VPS consumes power, and the manner in which it shares visit data with remote computing devices.

FIG. 8 shows the configuration component 418 introduced in FIG. 3. The configuration component 418 performs at least two roles. A state machine control component 802 controls the operation of the state machines 208 based on the power-related status of the computing device 104. A privacy control component 806 governs the extent to which the computing device 104 forwards visit data to the backend system 308.

More specifically, the state machine control component 802 can receive an input signal which indicates the current level of the battery 404. It can also receive an input signal which indicates whether the computing device 104 is currently plugged into an AC power source via the power connector 406. The state machine control component 802 can optionally receive other input signals, such as a preference setting by the user; that setting may indicate the user's preference as to how much power the chosen state machine is to consume in operation (e.g., based on a low, medium, or high setting). These input signals collectively reflect the power status of the computing device 104.

In response to the above input signals, the state machine control component 802 determines one or more operating parameters of the chosen state machine. For example, the state machine control component 802 can choose the type(s) of movement-sensing mechanism(s) that are used to feed movement data to the state machine, e.g., by choosing a movement-sensing mechanism that has a relatively low resource consumption when the battery is low. For instance, when a high accuracy location determination is required, the state machine control component 802 can instruct the state machines to use cell tower triangulation when the battery 404 is low, instead of energy-expensive GPS triangulation. Alternatively, or in addition, the state machine control component 802 can choose the frequency at which the state machine relies on input signals from movement-sensing mechanism(s) 204, e.g., by decreasing the frequency of the energy-expensive GPS readings when the battery is low. Alternatively, or in addition, the state machine control component 802 can choose which state machine is used, e.g., by choosing the first state machine 210 over the second state machine 212 when the battery is low, and so on. The above-described types of control rules are set forth in the spirit of illustration, not limitation; other environments can modify other operating parameters in response to the power status of the computing device 104.

The state machine control component 802 can use any technology to map the input signals into output instructions. In one case, the state machine control component 802 can use a set of discrete rules to perform this task, e.g., which can be implemented as a lookup table which maps a set of input signals to output instructions. A data store 804 may store those rules.

The state machine control component 802 can also include a learning component. The learning component registers an extent to which a change in the state machine reduces its accuracy. The learning component can automatically modify the operating parameters when it discovers that the accuracy falls below a prescribed threshold value. For example, assume that the state machine control component 802 decreases the frequency at which GPS readings are made to reduce power consumption. The learning component can then determine how this change affects the performance of the state machine. For example, the learning component can determine whether the rate of detecting visits has decreased by more than a prescribed amount in response to the change. If so, the learning component can increase the frequency at which GPS readings are made. It can also optionally modify the rule by which this operating parameter is controlled, e.g., by indicating that the frequency should not henceforth be lowered below a prescribed threshold value.

Alternatively, or in addition, the state machine control component 802 can send a message to a user in anticipation (or upon the actual experience) of substandard performance of the state machine. The message can request the user to connect the computing device 104 to an AC power source, etc. The state machine control component 802 can also send such a message when it detects that the user is approaching, or has arrived at, a known work site.

Now referring to the privacy control component 806, this component governs the manner in which the VPS 202 handles visit data, with respect to privacy-related issues, based on one or more input signals. In many cases, the privacy control component 806 can receive an input signal from the context-determining component 214 which identifies whether a candidate visit under consideration is a work-related visit. If so, it permits the visit data associated with this visit to be sent to the backend system 308; if not, it prohibits the transmission of the visit data to the backend system 308. As described above, the context-determining component 214 can use multiple factors to determine whether a candidate visit is work-related, such as: the user's explicit classification of the visit; and/or an indication that the visit falls within user-designated work hours; and/or an indication that the user has added a supplemental content to the visit data, etc.

In other implementations, the privacy control component 806 can perform more fine-grained privacy control, e.g., by permitting the transmission of privacy data for some work visits, but not others, e.g., upon request from clients and/or other considerations. In one case, the privacy control component 806 can provide a user interface presentation (not shown) that allows a user to specify a set of times, places, etc. for which visits are to be considered as private. If a current candidate visit meets any of these characteristics, the privacy control component 806 will refrain from sending it to the backend system 308.

The privacy control component 806 can use any technology to map the input signals into output instructions. In one case, the privacy control component 806 can use a set of discrete rules to perform this task, e.g., which can be implemented by a lookup table which maps a set of input signals to output instructions. A data store 808 may store those rules. In another case, the privacy control component 806 can include one or more machine-trained models and/or rules-based engines to make privacy-related decisions. The privacy control component 806 can also incorporate a learning component that adapts the privacy control component's performance based, in part, on prior privacy-related decisions made by the user.

The ellipsis 810 indicates that the configuration component 418 can perform other configuration tasks. For example, as already noted above, the configuration component 418 can choose the parameters of the state machine(s) 208 based on the profession, user habits, work location, etc. of the user. The configuration component 418 can consult a lookup table to perform this task, which maps user information to operating parameters. The configuration component 418 can also include a learning component which adjusts this parameter-setting behavior based on the observed performance of prior parameter selection choices in detecting work-related visits. The configuration component 418 can also make various settings based on the preferences of an individual user. Such settings may govern, for instance, the timing and frequency at which the visit assistance tool 218 generates output presentations.

A.4. The Visit Assistance Tool

Figure 9:
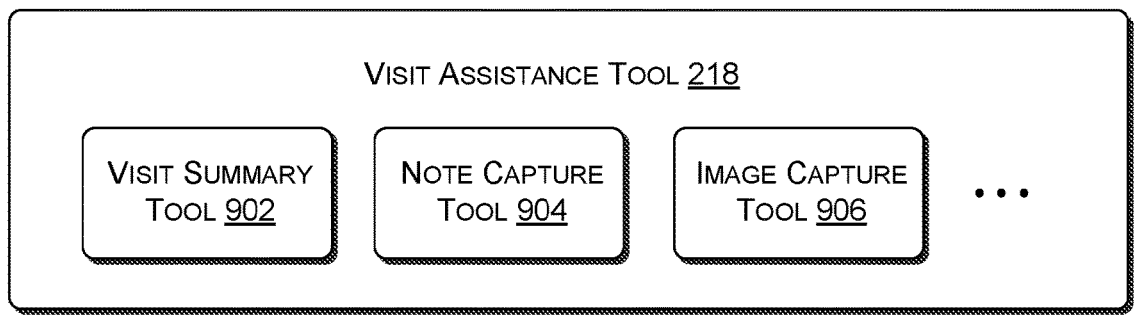
FIG. 9 shows a visit assistance tool. The visit assistance tool provides various services to a user during and/or after a candidate visit.

FIG. 9 shows one implementation of the visit assistance tool 218. The visit assistance tool 218 provides one or more services to a user during a candidate visit, or after a candidate visit. For instance, it can include a visit summary tool 902 which provides salient information regarding a candidate visit in progress, or which has recently completed. It can include a note capture tool 904 which allows a user to add textual notes to the visit data. It can include an image capture tool 906 which allows the user to add an image (or video) to the visit data. It can include an audio capture tool (not shown) which allows the user to add audio information to the visit data, such as the spoken commentary of the user regarding a work project, and so on. The above-described subcomponents are set forth in the spirit of illustration, not limitation.

FIG. 10 shows one graphical user interface (UI) presentation 1002 provided by the visit assistance tool 218 of FIG. 9. In one implementation, the visit assistance tool 218 presents the UI presentation 1002 a short time (e.g., a few seconds) after the state machine detects that a user has commenced a candidate visit. In one approach, the visit assistance tool 1002 presents this UI presentation 1002 only when it determines that the candidate visit is a work-related visit. In other cases, the visit assistance tool 718 presents the UI presentation 1002 for any candidate visit; it then relies on the user to tell it that the candidate visit is not work-related, or the user does not otherwise wish to receive the UI presentation 1002 in a present circumstance.

More specifically, the UI presentation 1002 includes a card 1004 that describes a candidate visit in progress. The card 1004 includes a map snippet 1006 that shows the current location of the user. It can also display information 1008 regarding the current location, e.g., using a lookup table to map the coordinates of the location to its business name. The card 1004 can also show a summary 1010 of the visit at the current time, as provided by the visit summary tool 902. For example, the summary 1010 can show the amount of time that the user has currently spent at the site, the user's billing rate, and the amount of money which the user has currently earned at the site.

The card 1004 can also show a set of icons 1012 associated with various assistance services and other functions. For instance, the user can activate a notepad icon 1014 to invoke the note capture tool 904 and an associated user interface presentation. The user can activate a camera icon 1016 to invoke the image capture tool 906 and an associated user interface presentation. The user can activate a microphone icon 1018 to invoke an audio capture tool and an associated user interface presentation. The user can activate a trash icon 1020 to delete the candidate visit and its associated visit data. The user can activate a "back" icon 1022 to return to a previous UI presentation that was provided, prior to the presentation of the card 1004. The context-determining component 214 can store a signal each time that a user attaches a supplemental content item to an instance of visit data. This signal can be used to improve the context-determining component's ability to discriminate between work-related and non-work-related visits, based on the premise that, most of the time, the user's interaction with these icons 1012 will be for work-related purposes.

FIG. 11 shows another UI presentation 1102 provided by the visit assistance tool 218 of FIG. 9. The visit assistance tool 218 can present this UI presentation 1102 immediately after the end of a candidate visit is detected, or any time thereafter. Presume that, at the time that the visit assistance tool 218 presents the UI presentation 1102, the user has traveled by car from the site at which work has been performed (the "ABC Company") to another location. The UI presentation 1102 can optionally present map information 1104 which contains a map snippet 1106 showing the work site location, and a map snippet 1108 showing the user's current location.

The UI presentation 1102 can also include summary information 1110 which summarizes the work that was done at the work site. The summary information 1110 can include a map snippet 1112 showing the location of the work site in greater detail than the map snippet 1106. It can also include work information 1114 which summarizes the amount of time that the user worked at the site, together with the amount to be charged to the client associated with the work site.

Finally, the UI presentation 1102 includes a graphical control 1116 which allows a user to control whether the work performed at the site should be billed to the client or not. For instance, the user can swipe left on the graphical control 1116 to instruct the visit assistance tool 218 not to bill for the work, and swipe right to instruct the visit assistance tool 218 to bill for the work. Upon swiping right, the visit assistance tool 218 can send the visit data associated with the work to the post-processing component 220. The context-determining component 214 can store a signal each time that a user manually classifies a candidate visit as work-related or non-work-related in the above-described manner. This signal can be used to improve the context-determining component's ability to discriminate between work-related and non-work-related visits. Alternatively, or in addition, the context-determining component 214 can automatically detect that the candidate job shown in FIG. 11 is work-related, and automatically send the associated visit data to the post-processing component 220.

A.5. Post-Processing Component

Figure 12:
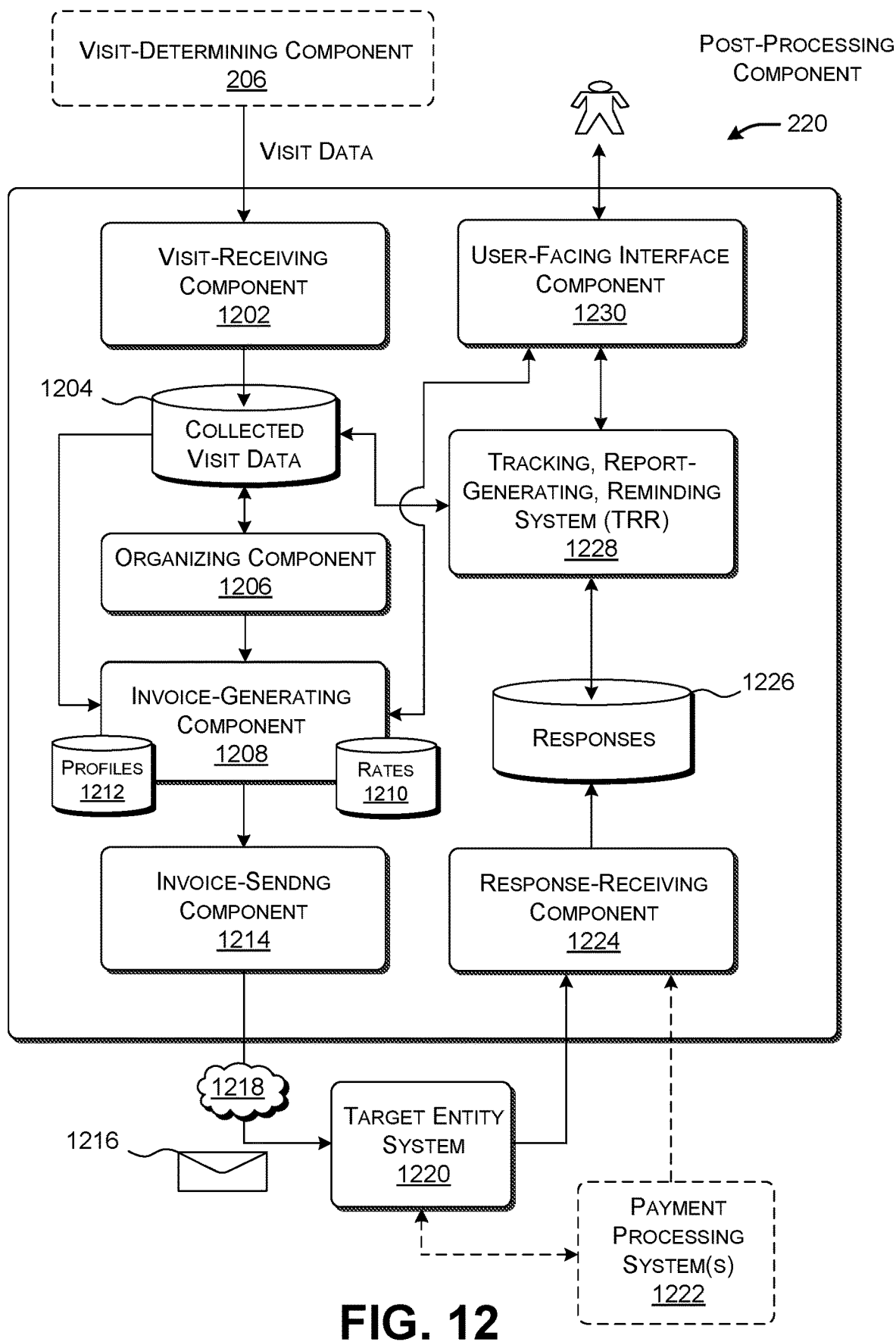
FIG. 12 shows an illustrative post-processing component for processing visit data. The particular post-processing component of FIG. 12 generates and manages invoices.

FIG. 12 shows one implementation of the post-processing component 220 for processing visit data. The particular post-processing component 220 of FIG. 12 generates and manages invoices for work completed on work-related visits. Different users associated with different organizational structures can make use of the post-processing component 220. For example, a self-employed individual can use the post-processing component 220 to provide invoices to clients for which the individual has performed work. In another case, an owner or other authorized individual of an organization can use the post-processing component 220 to provide invoices to clients for which the organization's employees have performed work. In another case, an employee of an organization can use the post-processing component 220 to submit requests for reimbursement for work he or she has performed for the organization. The above-described scenarios are set forth in the spirit of illustration, not limitation. The post-processing component 220 can be used in other contexts. Generally, FIG. 12 refers to the person who is in control of generating and sending the invoices as an originating user. It refers to the person or entity to which the invoice is directed as a target entity.

A visit-receiving component 1202 receives visit data from the visit-determining component 206. The visit-receiving component 1202 can store the visit data in a data store 1204. An optional organizing component 1206 can sort different instances of visit data into appropriate environment-specific categories. For instance, the organizing component 1206 can group visits performed by the same worker, and/or at the same site, etc. Alternatively, the organizing component 1206 can work in conjunction with the agglomeration component 710 to merge separate visits into a single visit. The organizing component 1206 stores its sorted instances of visit data back into the data store 1204, or into another data store (not shown).

An invoice-generating component 1208 generates invoices for the work-related visits described by the visit data. To perform this task, the invoice-generating component 1208 can make use of a data store of invoice templates. It can also consult information regarding rates, taxes, etc. (in a data store 1210), information regarding the entities being billed (in a data store 1212), information regarding the users who performed the work, and so on. The invoice-generating component 1208 also solicits information from the user, such as information regarding the identity of the target entity, if not automatically detected.

An invoice-sending component 1214 then sends the generated invoice(s) to the appropriate recipient(s), referred to herein as the target entity(ies). The invoice-sending component 1214 can perform this task in any manner, such as by generating an Email message 1216 that contains an invoice, and sending the Email message 1216 via a computer network 1218 to an Email account associated with a target entity. The target entity uses a target entity system 1220 to retrieve and respond to the Email message 1216. More specifically, the target entity can pay for the work described in the invoice with or without use of a payment processing system 1222. The invoice can optionally contain a link which allows the target entity to access the payment processing system 1222.

A response-receiving component 1224 receives the response from the target entity and stores it in a data store 1226. A tracking, report-generating, and reminding system (TRR) 1228 can perform various tracking and reporting functions. For example, the TRR 1228 can track the number of outstanding invoices, the number of paid invoices, the amount of expenses due, etc. The TRR 1228 can also send various reminders to the originating user who submitted the invoices and/or the target entity(ies) to which the invoices were sent. A user-facing interface component 1230 provides an interface by which the originating user can receive and view the reports and reminders.

A user may also interact with the invoice-generating component 1208 via the user-facing interface component 1230. For example, the user may use this interface component 1230 to supply information regarding a target-entity, to edit an automatically-generated invoice, to instruct the invoice-sending component 1214 to send the invoice, and so on.

B. Illustrative Processes

Figure 13:
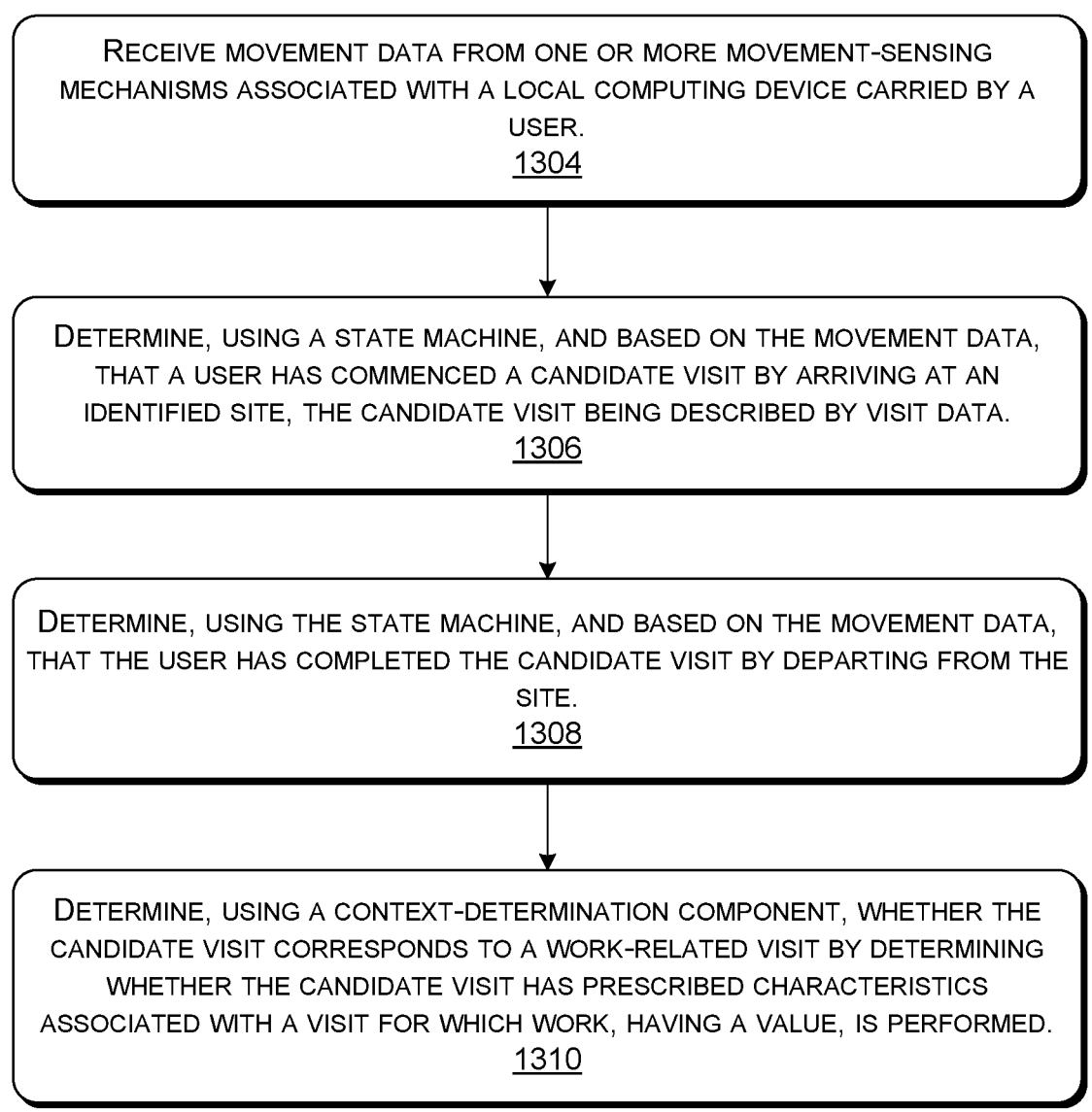
Figure 14:
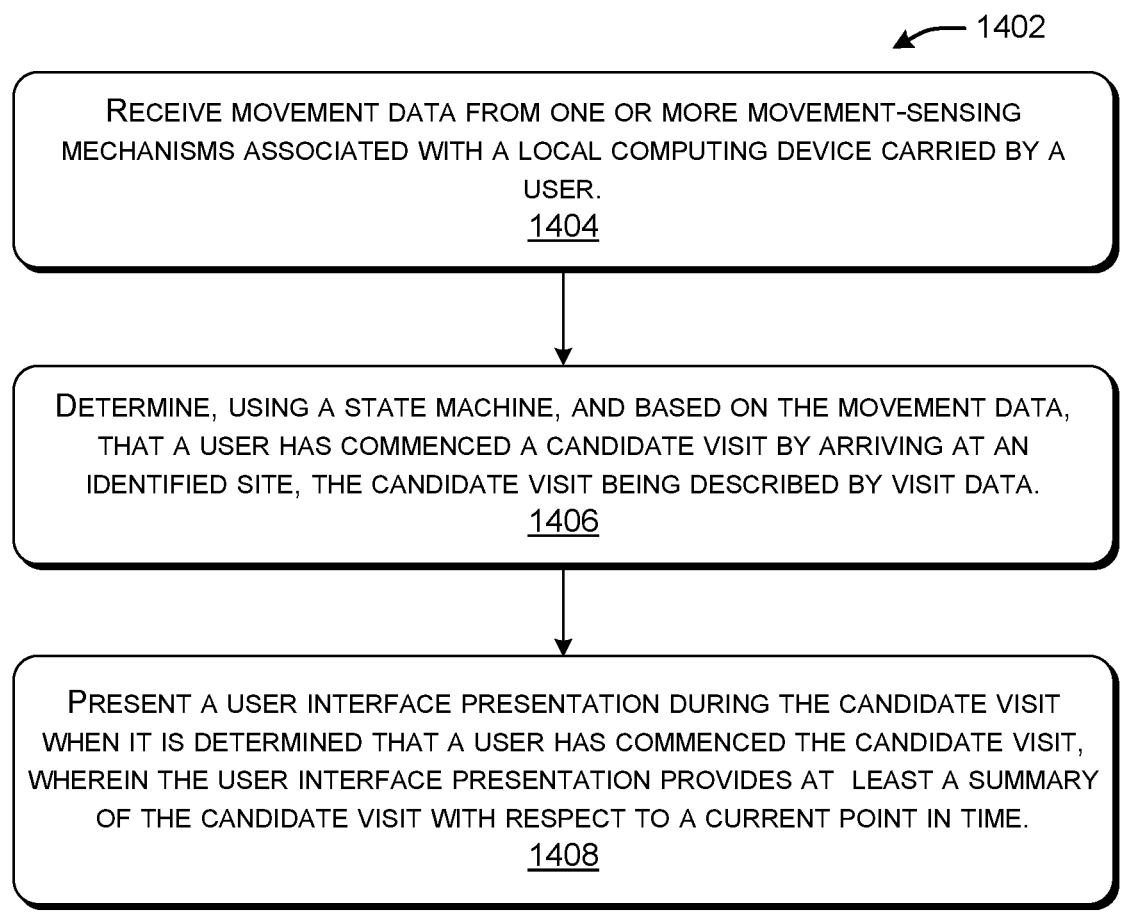

FIGS. 13-15 show processes that explain the operation of the VPS 202 of Section A in flowchart form. Since the principles underlying the operation of the VPS 202 have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

Beginning with the procedure 1302 of FIG. 13, in block 1304, the VPS 202 receives movement data from one or more movement-sensing mechanisms 204 associated with a local computing device 104 carried by a user. The movement-sensing mechanism(s) 204 include: at least one location-determining mechanism 412 that identifies a current location of the user; and at least one movement-sensing mechanism that identifies a kind of motion exhibited by the user, and/or a transition from one kind of motion to another kind of motion. In block 1306, the VPS 202 determines, using a state machine (210, 212), and based on the movement data, that a user has commenced a candidate visit by arriving at an identified site, the candidate visit being described by visit data. In block 1308, the VPS 202 determines, using the state machine (210, 212), and based on the movement data, that the user has completed the candidate visit by departing from the site. In block 1310, the VPS 202 determines, using a context-determining component 214, whether the candidate visit corresponds to a work-related visit by determining whether the candidate visit has prescribed characteristics associated with a visit for which work, having a value, is performed. The state machine (210, 212) includes: at least one state which establishes a perimeter with respect to an identified location, the state machine subsequently determining whether the user has moved outside the perimeter; at least one state which requests a movement-sensing mechanism to determine a current location of the user with a prescribed degree of accuracy; and at least one state which provides a countdown timer for determining whether a movement condition has prevailed for more than a prescribed amount of time.

Advancing to the procedure 1402 of FIG. 14, in block 1404, the VPS 202 receives movement data from one or more movement-sensing mechanisms 204 associated with a local computing device 104 carried by a user. The movement-sensing mechanism(s) 204 include: at least one movement-sensing mechanism that identifies a current location of the user; and at least one movement-sensing mechanism that identifies a kind of motion exhibited by the user, and/or a transition from one kind of motion to another kind of motion. In block 1406, the VPS 202 determines, using a state machine (210, 212), and based on the movement data, that a user has commenced a candidate visit by arriving at an identified site, the candidate visit being described by visit data. In block 1408, the VPS 202 presents a user interface presentation 108 during the candidate visit when it is determined that a user has commenced the candidate visit. The user interface presentation 108 provides a summary of the candidate visit with respect to a current point in time. The state machine (210, 212) includes: at least one state which establishes a perimeter with respect to an identified location, the state machine subsequently determining whether the user has moved outside the perimeter; at least one state which requests a movement-sensing mechanism to determine a current location of the user with a prescribed degree of accuracy; and at least one state which provides a countdown timer for determining whether a movement condition has prevailed for more than a prescribed amount of time.

Advancing to the procedure 1502 of FIG. 15, in block 1504, the VPS 202 determines a power-related status of a local computing device 104, the power-related status depending on: an input signal which indicates a battery level of a battery 404 provided by the local computing device 104; and/or an input signal which indicates whether the local computing device 104 is currently connected to an external constant power source. In block 1506, the VPS 202 sets at least one operating parameter of a state machine (210, 212) based on the power-related status that is identified. In block 1508, the VPS 202 receives movement data from one or more movement-sensing mechanisms 204 associated with the local computing device 104 carried by a user. The movement-sensing mechanism(s) 204 include: at least one movement-sensing mechanism that identifies a current location of the user; and at least one movement-sensing mechanism that identifies a kind of motion exhibited by the user, and/or a transition from one kind of motion to another kind of motion. In block 1510, the VPS 202 determines, using the state machine (210, 212), and based on the movement data, that a user has commenced a candidate visit by arriving at an identified site, the candidate visit being described by visit data. In block 1512, the VPS 202 determines, using the state machine (210, 212), and based on the movement data, that the user has completed the candidate visit by departing from the site.

C. Representative Computing Functionality

Figure 16:
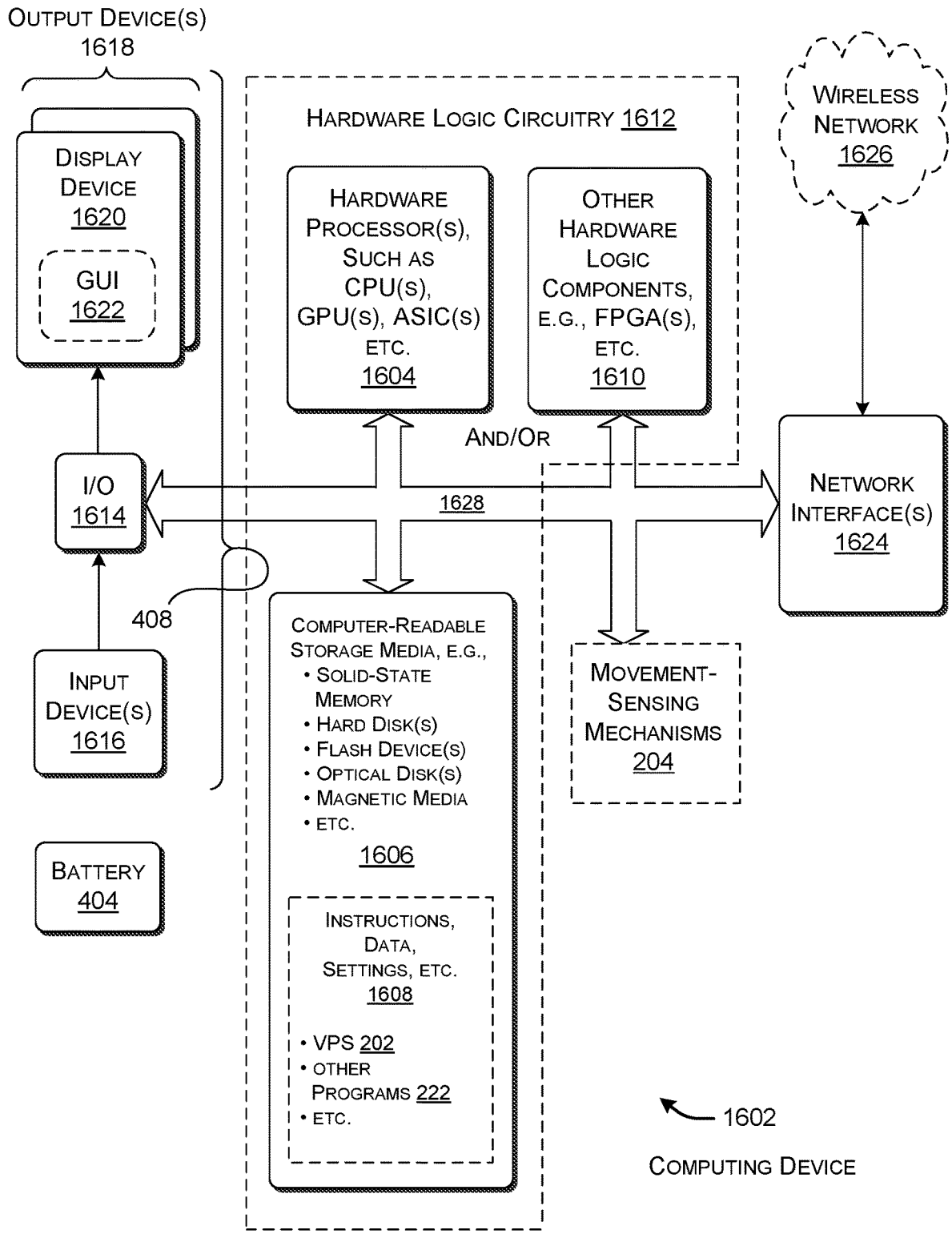
FIG. 16 shows an illustrative type of computing device that can be used to implement any aspect of the features shown in the foregoing drawings.

FIG. 16 shows a computing device 1602 that can be used to implement any aspect of the mechanisms set forth in the above-described figures. For instance, with reference to FIG. 3, the type of computing device 1602 shown in FIG. 16 can be used to implement the computing device 304, the other computing device 312, etc. Or the type of computing device 1602 can be used to implement any server provided by the backend system 308. In all cases, the computing device 1602 represents a physical and tangible processing mechanism.

The computing device 1602 can include one or more hardware processors 1604. The hardware processor(s) can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processor unit.

The computing device 1602 can also include computer-readable storage media 1606, corresponding to one or more computer-readable media hardware units. The computer-readable storage media 1606 retains any kind of information 1608, such as machine-readable instructions, settings, data, etc. Without limitation, for instance, the computer-readable storage media 1606 may include one or more solid-state devices, one or more magnetic hard disks, one or more optical disks, magnetic tape, and so on. Any instance of the computer-readable storage media 1606 can use any technology for storing and retrieving information. Further, any instance of the computer-readable storage media 1606 may represent a fixed or removable component of the computing device 1602. Further, any instance of the computer-readable storage media 1606 may provide volatile or non-volatile retention of information.

The computing device 1602 can utilize any instance of the computer-readable storage media 1606 in different ways. For example, any instance of the computer-readable storage media 1606 may represent a hardware memory unit (such as Random Access Memory (RAM)) for storing transient information during execution of a program by the computing device 1602, and/or a hardware storage unit (such as a hard disk) for retaining/archiving information on a more permanent basis. In the latter case, the computing device 1602 can also include one or more drive mechanisms (not shown) for storing and retrieving information from an instance of the computer-readable storage media 1606.

The computing device 1602 may perform any of the functions described above when the hardware processor(s) 1604 carry out computer-readable instructions stored in any instance of the computer-readable storage media 1606. For instance, the computing device 1602 may carry out computer-readable instructions to perform each block of the processes described in Section B.

Alternatively, or in addition, the computing device 1602 may rely on one or more other hardware logic components 1610 to perform operations using a task-specific collection of logic gates. For instance, the hardware logic component(s) 1610 may include a fixed configuration of hardware logic gates, e.g., that are created and set at the time of manufacture, and thereafter unalterable. Alternatively, or in addition, the other hardware logic component(s) 1610 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 16 generally indicates that hardware logic circuitry 1612 includes any combination of the hardware processor(s) 1604, the computer-readable storage media 1606, and/or the other hardware logic component(s) 1610. That is, the computing device 1602 can employ any combination of the hardware processor(s) 1604 that execute machine-readable instructions provided in the computer-readable storage media 1606, and/or one or more other hardware logic component(s) 1610 that perform operations using a fixed and/or programmable collection of hardware logic gates. More generally stated, the hardware logic circuitry 1612 corresponds to one or more hardware logic components of any type(s) that perform operations based on logic stored in and/or otherwise embodied in the hardware logic component(s).

In some cases (e.g., in the case in which the computing device 1602 represents a user computing device), the computing device 1602 also includes an input/output interface 1614 for receiving various inputs (via input devices 1616), and for providing various outputs (via output devices 1618). Illustrative input devices include a keyboard device, a mouse input device, a touchscreen input device, a digitizing pad, one or more static image cameras, one or more video cameras, one or more depth camera systems, one or more microphones, a voice recognition mechanism, and so on. One particular output mechanism may include a display device 1620 and an associated graphical user interface presentation (GUI) 1622. The display device 1620 may correspond to a liquid crystal display device, a light-emitting diode display (LED) device, a projection mechanism, etc. Other output devices include a printer, one or more speakers, a haptic output mechanism, an archival mechanism (for storing output information), and so on.

The computing device 1602 can also include one or more network interfaces 1624 for exchanging data with other devices via one or more communication conduits 1626. The network interface(s) 1624 can include the communication mechanism(s) 402 described in FIG. 4. The communication conduit(s) 1626 can encompass a wireless network implemented by the communication system 306. More generally, the communication conduit(s) 1626 can include any combination of hardwired links, wireless links, routers, gateway functionality, name servers, etc., governed by any protocol or combination of protocols.

One or more communication buses 1628 communicatively couple the above-described components together. A battery 404 and/or other power source provides power to all of the above-described components. The computing device 1602 also includes the movement-sensing mechanism(s) 204, described above.

FIG. 16 shows the computing device 1602 as being composed of a discrete collection of separate units. In some cases, the collection of units may correspond to discrete hardware units provided in a computing device chassis having any form factor. In other cases, the computing device 1602 can include a hardware logic component that integrates the functions of two or more of the units shown in FIG. 1. For instance, the computing device 1602 can include a system on a chip (SoC or SOC), corresponding to an integrated circuit that combines the functions of two or more of the units shown in FIG. 16.

The following summary provides a non-exhaustive set of illustrative aspects of the technology set forth herein.

According to a first aspect, one or more computing devices for detecting visits are described. The computing device(s) include: hardware logic circuitry, the hardware logic circuitry corresponding to: (a) one or more hardware processors that perform operations by executing machine-readable instructions stored in a memory, and/or (b) one or more other hardware logic components that perform operations using a task-specific collection of logic gates. The operations include receiving movement data from one or more movement-sensing mechanisms associated with a local computing device carried by a user. The movement-sensing mechanism(s) include: at least one location-determining mechanism that identifies a current location of the user; and at least one movement-sensing mechanism that identifies a kind of motion exhibited by the user, and/or a transition from one kind of motion to another kind of motion. The operations further include: determining, using a state machine, and based on the movement data, that a user has commenced a candidate visit by arriving at an identified site, the candidate visit being described by visit data; determining, using the state machine, and based on the movement data, that the user has completed the candidate visit by departing from the site; and determining, using a context-determining component, whether the candidate visit corresponds to a work-related visit by determining whether the candidate visit has prescribed characteristics associated with a visit for which work, having a value, is performed. The state machine includes: at least one perimeter-checking state which establishes a perimeter with respect to an identified location, the state machine subsequently determining whether the user has moved outside the perimeter; at least one location-determining state which requests the location-determining mechanism(s) to determine a current location of the user with a prescribed degree of accuracy; and at least one timer state which provides a countdown timer for determining whether a movement condition has prevailed for more than a prescribed amount of time. The one perimeter-checking state(s) and the timer state(s) serves, in part, to manage a number of times that the location-determining mechanism(s) are asked to determine the current location in the location-determining state(s).

According to a second aspect, the state machine detects two or more types of movement exhibited by the user.

According to a third aspect, dependent on the second aspect, the state machine detects at least one kind of pedestrian-related movement and at least one kind of vehicular-related movement.

According to a fourth aspect, the operations further include presenting a user interface presentation during the candidate visit when it is determined that a user has commenced the candidate visit.

According to a fifth aspect, dependent on the fourth aspect, the user interface presentation provides a summary of the candidate visit with respect to a current point in time.

According to a sixth aspect, dependent on the fourth aspect, the user interface presentation provides access to one or more tools, each tool, upon activation, enabling a user to associate a supplemental content item with the visit data.

According to a seventh aspect, the operations further include: determining a power-related status of the local computing device, the power-related status depending on an input signal which indicates a battery level of a battery provided by the local computing device, and/or an input signal which indicates whether the local computing device is currently connected to an external constant power source; and setting at least one operating parameter of the state machine based on the power-related status that is identified.

According to an eighth aspect, dependent on the seventh aspect, wherein the setting operation includes: setting a type of movement-sensing mechanism that is used to feed movement data to the state machine; and/or setting a frequency of collecting movement data from at least one movement-sensing mechanism.

According to a ninth aspect, wherein the operations further include: determining whether to send the visit data to a remote computing device based on at least one privacy-related input signal; and if the determining of whether to send the visit data is answered in the affirmative, sending the visit data to the remote computing device.

According to a tenth aspect, dependent on the ninth aspect, wherein one privacy-related input signal indicates whether the candidate visit occurs within a span of time that the user has previously designated as work-related.

According to an eleventh aspect, the state machine is provided by the local computing device, and wherein at least part of the context determination component is implemented by a remote computing device.

According to a twelfth aspect, the operation of determining whether the candidate visit corresponds to a work-related visit includes: determining whether the candidate visit occurs within a span of time that the user has previously designated as work-related; and/or determining whether the user has associated a content item with the visit data; and/or determining whether the user has manually designated the candidate visit as a work-related visit.

According to a thirteenth aspect, wherein the operation of determining whether the candidate visit corresponds to a work-related visit includes: comparing the visit data associated with the candidate visit with one or more previous instances of visit data that have been associated with one or more respective work-related visits; and identifying the candidate visit as a work-related visit if the visit data matches the previous instance(s) of visit data.

According to a fourteenth aspect, the operations further include: determining whether the visit data matches one or more previous instances of visit data that have been associated with one or more respective work-related visits; and aggregating the candidate visit with the previous visit(s) when it is determined that the visit data matches the previous instance(s) of visit data.

According to a fifteenth aspect, the operations further include: sending the visit data to a post-processing component; and at the post-processing component, generating an invoice associated with the visit data; and sending the invoice to a target entity for which work, associated with the work-related visit, has been performed.

According to a sixteenth aspect, a method is described, implemented by one or more computing devices. The method includes receiving movement data from one or more movement-sensing mechanisms associated with a local computing device carried by a user. The movement-sensing mechanism(s) include: at least one location-determining mechanism that identifies a current location of the user; and at least one movement-sensing mechanism that identifies a kind of motion exhibited by the user, and/or a transition from one kind of motion to another kind of motion. The method further includes: determining, using a state machine, and based on the movement data, that a user has commenced a candidate visit by arriving at an identified site, the candidate visit being described by visit data; and presenting a user interface presentation during the candidate visit when it is determined that a user has commenced the candidate visit, wherein the user interface presentation provides at least a summary of the candidate visit with respect to a current point in time. The state machine includes: at least one perimeter-checking state which establishes a perimeter with respect to an identified location, the state machine subsequently determining whether the user has moved outside the perimeter; at least one location-determining state which requests the location-determining mechanism(s) to determine a current location of the user with a prescribed degree of accuracy; and at least one timer state which provides a countdown timer for determining whether a movement condition has prevailed for more than a prescribed amount of time.

According to a seventeenth aspect, the method of the sixteenth aspect further includes determining, using a context-determining component, whether the candidate visit corresponds to a work-related visit by determining whether the candidate visit has prescribed characteristics associated with a visit for which work, having a value, is performed.

According to an eighteenth aspect, the method of the sixteenth aspect further includes: determining a power-related status of the local computing device, the power-related status depending on an input signal which indicates a battery level of the local computing device, and/or an input signal which indicates whether the local computing device is currently connected to an external constant power source; and setting at least one operating parameter of the state machine based on the power-related status that is identified.

According to a nineteenth aspect, the method of the sixteenth aspect, further includes: determining whether to send the visit data to a remote computing device based on at least one privacy-related input signal; and if the determining of whether to send the visit data is answered in the affirmative, sending the visit data to the remote computing device.

According to a twentieth aspect, a computer-readable storage medium is described for storing computer-readable instructions. The computer-readable instructions, when executed by one or more hardware processors, perform a method. The method includes: determining a power-related status of a local computing device, the power-related status depending on an input signal which indicates a battery level of a battery provided by the local computing device, and/or an input signal which indicates whether the local computing device is currently connected to an external constant power source; setting at least one operating parameter of a state machine based on the power-related status that is identified; and receiving movement data from one or more movement-sensing mechanisms associated with the local computing device carried by a user. The movement-sensing mechanism(s) include: at least one location-determining mechanism that identifies a current location of the user; and at least one movement-sensing mechanism that identifies a kind of motion exhibited by the user, and/or a transition from one kind of motion to another kind of motion. The method further includes: determining, using the state machine, and based on the movement data, that a user has commenced a candidate visit by arriving at an identified site, the candidate visit being described by visit data; and determining, using the state machine, and based on the movement data, that the user has completed the candidate visit by departing from the site.

A twenty-first aspect corresponds to any combination (e.g., any logically consistent permutation or subset) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computing devices for detecting visits, comprising:
    hardware logic circuitry, the hardware logic circuitry corresponding to: (a) one or more hardware processors that perform operations by executing machine-readable instructions stored in a memory, and/or (b) one or more other hardware logic components that perform the operations using a task-specific collection of logic gates, the operations including:
        receiving movement data from one or more movement-sensing mechanisms associated with a local computing device carried by a user, said one or more movement-sensing mechanisms including:
            at least one location-determining mechanism that identifies a current location of the user; and
            at least one motion analysis mechanism that identifies a kind of motion exhibited by the user, and/or a transition from one kind of motion to another kind of motion;
        determining, using a state machine, and based on the movement data, that the user has commenced a candidate visit by arriving at an identified site, the candidate visit being described by visit data;
        determining, using the state machine, and based on the movement data, that the user has completed the candidate visit by departing from the site; and
        determining, using a context-determining component, whether the candidate visit corresponds to a work-related visit by determining whether the candidate visit has prescribed characteristics associated with a visit for which work, having a value, is performed,
    wherein said at least one motion analysis mechanism provides event signals that specify a mode of transportation being used by the user, and
    wherein the state machine includes state transitions that depend on the event signals that specify the mode of transportation being used by the user,
    wherein the state machine further includes:
        at least one perimeter-checking state which establishes a spatial perimeter with respect to an identified location, the state machine subsequently determining whether the user has moved outside the perimeter, said at least one perimeter-checking state using a first location technique to determine a current location of the user; and
        an arrival state and a departure state associated with a start and end, respectively, of the candidate visit, the arrival state and the departure state each using a second location technique to determine the current location of the user,
        the first location technique being less accurate than the second location technique, and the first location technique consuming less power than the second location technique.

2. The one or more computing devices of claim 1, wherein one mode of transportation corresponds to a kind of pedestrian-related movement and another mode of transportation corresponds to a kind of vehicular-related movement.

3. The one or more computing devices of claim 1, wherein the operations further include presenting a graphical user interface presentation during the candidate visit when it is determined that the user has commenced the candidate visit, wherein the user interface presentation provides:
    a summary of the candidate visit with respect to a current point in time; and
    graphical icons that provide access to one or more tools, each tool, upon activation, enabling the user to associate a supplemental content item with the visit data.

4. The one or more computing device of claim 1, wherein the operations further include:
    determining a power-related status of the local computing device, the power-related status depending on: an input signal which indicates a battery level of a battery provided by the local computing device; and/or an input signal which indicates whether the local computing device is currently connected to an external constant power source; and, setting at least one operating parameter of the state machine based on the power-related status that is identified for a purpose of governing an amount of the resources consumed by the local computing device in detecting visits.

5. The one or more computing devices of claim 4, wherein said setting comprises:

setting a type of movement-sensing mechanism that is used to feed the movement data to the state machine; and/or setting a frequency of collecting the movement data from at least one movement-sensing mechanism.

6. The one or more computing devices of claim 1, wherein the operations further include:

determining whether to send the visit data to a remote computing device based on at least one privacy-related input signal; and in response to said determining whether to send the visit data, sending the visit data to the remote computing device, wherein one privacy-related input signal indicates whether the user has associated a supplemental content item with the visit data.

7. The one or more computing devices of claim 1, wherein said determining whether the candidate visit corresponds to a work-related visit comprises determining whether the user has associated a supplemental content item with the visit data.

8. The one or more computing devices of claim 1, wherein said determining whether the candidate visit corresponds to a work-related visit comprises:

using a user profile associated with the user to identify an occupation associated with the user;

comparing the visit data associated with the candidate visit with a stored pattern of work-related visits associated with the occupation of the user; and identifying the candidate visit as a work-related visit if the visit data matches the pattern.

9. The one or more computing devices of claim 1, wherein the operations further include:

for a case in which a work-related visit has been detected, sending the visit data to a post-processing component, the visit data specifying an automatically-determined amount of time that the user has spent on the work-related visit;

at the post-processing component, generating an invoice associated with the visit data based on the amount of time; and sending the invoice to a target entity for which work, associated with the work-related visit, has been performed.

10. The one or more computing devices of claim 1, wherein one of said at least one perimeter-checking states is used to determine whether the user is currently in a state of movement.

11. A method, implemented by one or more computing devices, comprising:

receiving movement data from one or more movement-sensing mechanisms associated with a local computing device carried by a user, said one or more movement-sensing mechanisms including:

at least one location-determining mechanism that identifies a current location of the user; and at least one motion analysis mechanism that identifies a kind of motion exhibited by the user, and/or a transition from one kind of motion to another kind of motion;

determining, using a state machine, and based on the movement data, that the user has commenced a candidate visit by arriving at an identified site, the candidate visit being described by visit data; and presenting a graphical user interface presentation during the candidate visit when it is determined that the user has commenced the candidate visit, wherein the user interface presentation provides at least:

a summary of the candidate visit with respect to a current point in time; and graphical icons that provide access to one or more tools, each tool, upon activation, enabling the user to associate a supplemental content item with the visit data, the method further comprising automatically classifying the candidate visit as a work-related visit in response to detecting interaction by the user with one of the graphical icons.

12. The method of claim 11, wherein said presenting presents the graphical user interface presentation when the candidate visit corresponds to a work-related visit, and does not present the graphical user interface presentation when the candidate visit does not correspond to a work-related visit.

13. The method of claim 11, wherein the summary provides a map showing the identified site, and an indication of an amount of time that the user has currently spent at the identified site.

14. The method of claim 11, wherein the graphical user interface presentation includes a graphical control that allows the user to indicate whether work performed at the identified site should be billed or not to a target entity.

15. A computer-readable storage medium for storing computer-readable instructions, the computer-readable instructions, when executed by one or more hardware processors, performing a method that comprises:

determining a power-related status of a local computing device, the power-related status depending on: an input signal which indicates a battery level of a battery provided by the local computing device; and/or an input signal which indicates whether the local computing device is currently connected to an external constant power source;

setting at least one operating parameter of a state machine based on the power-related status that is identified, for a purpose of governing an amount of the resources consumed by the local computing device in detecting visits;

receiving movement data from one or more movement-sensing mechanisms associated with the local computing device carried by a user, said one or more movement-sensing mechanisms including:

at least one location-determining mechanism that identifies a current location of the user; and at least one motion analysis mechanism that identifies a kind of motion exhibited by the user, and/or a transition from one kind of motion to another kind of motion;

determining, using the state machine, and based on the movement data, that the user has commenced a candidate visit by arriving at an identified site, the candidate visit being described by visit data; and determining, using the state machine, and based on the movement data, that the user has completed the candidate visit by departing from the site, wherein the method further includes:

registering an extent to which a change in said at least one operating parameter of the state machine reduces a level of accuracy of the state machine; and automatically modifying said at least one operating parameter based on said registering.

16. The computer-readable storage medium of claim 15, wherein said setting comprises:

setting a type of movement-sensing mechanism that is used to feed the movement data to the state machine; and/or setting a frequency of collecting the movement data from at least one movement-sensing mechanism.

17. A computer-readable storage medium for storing computer-readable instructions, the computer-readable instructions, when executed by one or more hardware processors, performing a method that comprises:

determining a power-related status of a local computing device, the power-related status depending on: an input signal which indicates a battery level of a battery provided by the local computing device; and/or an input signal which indicates whether the local computing device is currently connected to an external constant power source;

setting at least one operating parameter of a state machine based on the power-related status that is identified, for a purpose of governing an amount of the resources consumed by the local computing device in detecting visits;

receiving movement data from one or more movement-sensing mechanisms associated with the local computing device carried by a user, said one or more movement-sensing mechanisms including:

at least one location-determining mechanism that identifies a current location of the user; and at least one motion analysis mechanism that identifies a kind of motion exhibited by the user, and/or a transition from one kind of motion to another kind of motion;

determining, using the state machine, and based on the movement data, that the user has commenced a candidate visit by arriving at an identified site, the candidate visit being described by visit data; and determining, using the state machine, and based on the movement data, that the user has completed the candidate visit by departing from the site, wherein the method further includes:

identifying actual or anticipated performance of the state machine below a prescribed level; and in response to said identifying the actual or anticipated performance, sending a message to the user, requesting the user to connect the local computing device to an external constant power source.

\* \* \* \* \*